(12) United States Patent
Gildert et al.

(10) Patent No.: US 12,263,594 B2
(45) Date of Patent: *Apr. 1, 2025

(54) SYSTEMS, ROBOTS, AND METHODS FOR SELECTING CLASSIFIERS BASED ON CONTEXT

(71) Applicant: Sanctuary Cognitive Systems Corporation, Vancouver (CA)

(72) Inventors: Suzanne Gildert, Vancouver (CA); William G. Macready, West Vancouver (CA); Thomas Mahon, Ariss (CA)

(73) Assignee: Sanctuary Cognitive Systems Corporation, Vancouver (CA)

( * ) Notice: Subject to any disclaimer, the term of this patent is extended or adjusted under 35 U.S.C. 154(b) by 171 days.

This patent is subject to a terminal disclaimer.

(21) Appl. No.: 18/079,717

(22) Filed: Dec. 12, 2022

(65) Prior Publication Data

US 2023/0111067 A1    Apr. 13, 2023

Related U.S. Application Data

(63) Continuation of application No. 17/962,365, filed on Oct. 7, 2022.

(60) Provisional application No. 63/253,591, filed on Oct. 8, 2021.

(51) Int. Cl.
*G06V 10/80*    (2022.01)
*B25J 9/16*    (2006.01)

(52) U.S. Cl.
CPC ............ *B25J 9/1661* (2013.01); *B25J 9/163* (2013.01)

(58) Field of Classification Search
CPC ........ B25J 9/1661; B25J 9/163; G06V 10/809
USPC ......................................................... 700/250
See application file for complete search history.

(56) References Cited

U.S. PATENT DOCUMENTS

| | | | |
|---|---|---|---|
| 9,314,924 B1* | 4/2016 | Laurent | B25J 9/163 |
| 10,729,502 B1* | 8/2020 | Wolf | G06V 20/49 |
| 10,776,423 B2* | 9/2020 | Kontschieder | G06F 18/24155 |
| 11,710,309 B2* | 7/2023 | Shotton | G06V 20/20 |
| | | | 382/159 |

(Continued)

FOREIGN PATENT DOCUMENTS

| | | | | |
|---|---|---|---|---|
| CN | 110369331 A | * | 10/2019 | |
| CN | 112742026 A | * | 5/2021 | ............. A63F 13/52 |

(Continued)

*Primary Examiner* — B M M Hannan
(74) *Attorney, Agent, or Firm* — Thomas Mahon; Adenike Adebiyi

(57) ABSTRACT

The present disclosure describes systems, robots, and methods for organizing and selecting classifiers of a library of classifiers. The classifiers of the library of classifiers can be organized in a relational model, such as a hierarchy or probability model. Instead of storing, activating, or executing the entire library of classifiers at once by a robot system, computational resource demand is reduced by executing subset of classifiers to determine context, and the determined context is used as a basis for selection of another subset of classifiers. This process can be repeated, to iteratively refine context and select more specific subsets of classifiers. A selected subset of classifiers can eventually be specific to a task to be performed by the robot system, such that the robot system can take action based on output from executing such specific classifiers.

19 Claims, 4 Drawing Sheets

(56) References Cited

U.S. PATENT DOCUMENTS

| | | | |
|---|---|---|---|
| 11,759,265 B2 * | 9/2023 | Griffiths | A61B 34/30 700/250 |
| 2016/0096272 A1 * | 4/2016 | Smith | B25J 9/1697 700/255 |
| 2016/0303738 A1 * | 10/2016 | Laurent | G05D 1/222 |
| 2018/0285697 A1 * | 10/2018 | Shotton | G06V 10/764 |
| 2018/0311817 A1 * | 11/2018 | Laurent | B25J 9/163 |
| 2018/0319015 A1 * | 11/2018 | Sinyavskiy | G05D 1/0088 |
| 2019/0102667 A1 * | 4/2019 | Bashkirov | G06V 10/764 |
| 2019/0206400 A1 * | 7/2019 | Cui | B25J 9/1697 |
| 2019/0366538 A1 * | 12/2019 | Laurent | G05D 1/2297 |
| 2020/0027364 A1 * | 1/2020 | Singh | G09B 5/06 |
| 2020/0070352 A1 * | 3/2020 | Larzaro-Gredilla | G06N 7/01 |
| 2021/0004589 A1 * | 1/2021 | Turkelson | G06V 30/19173 |
| 2021/0024297 A1 * | 1/2021 | Sun | B65G 61/00 |
| 2022/0284235 A1 * | 9/2022 | Jones | G06F 30/27 |
| 2023/0072966 A1 * | 3/2023 | Batsos | G06V 10/809 |

FOREIGN PATENT DOCUMENTS

| | | | | |
|---|---|---|---|---|
| CN | 115699050 A | * | 2/2023 | G05B 19/042 |
| EP | 3967414 A1 | * | 3/2022 | B07C 5/342 |
| JP | 2011022991 A | * | 2/2011 | G06F 16/51 |
| WO | WO-2022251924 A1 | * | 12/2022 | G06F 16/55 |

* cited by examiner

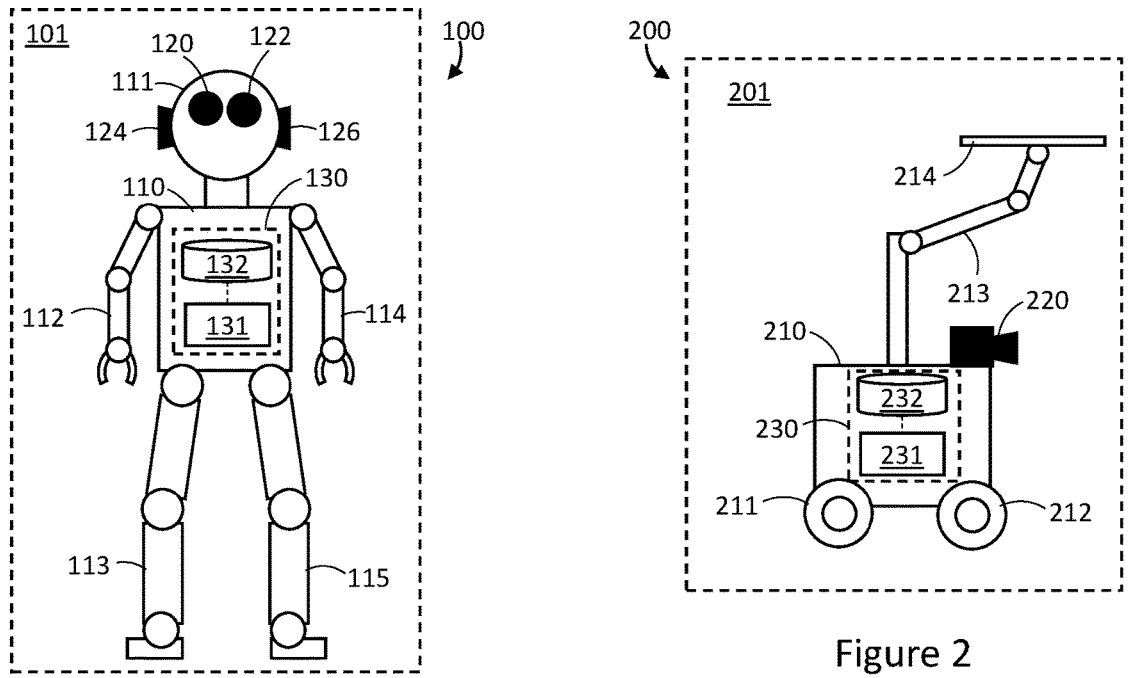
Figure 1
Figure 2
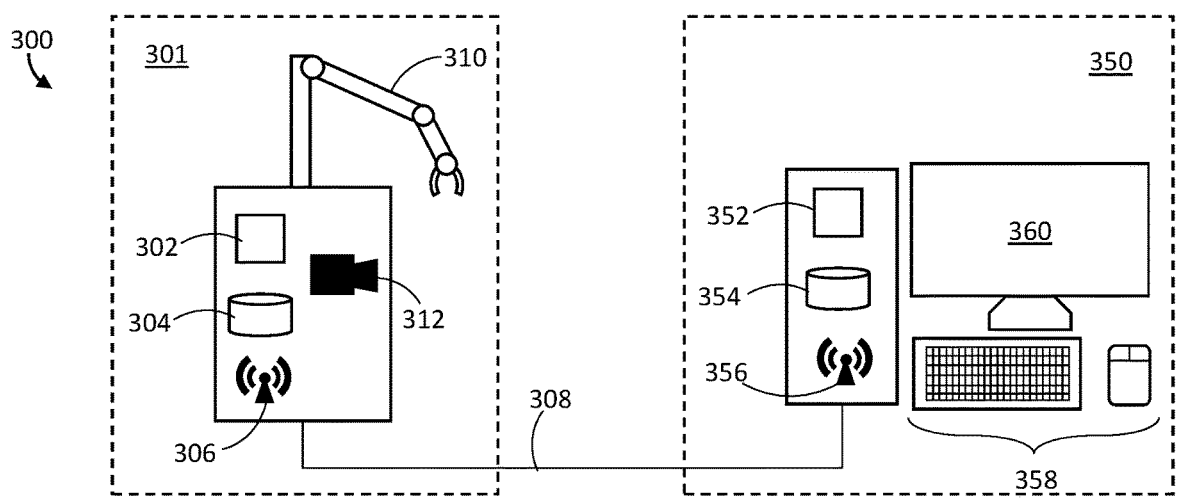
Figure 3

SYSTEMS, ROBOTS, AND METHODS FOR SELECTING CLASSIFIERS BASED ON CONTEXT

CROSS-REFERENCE TO RELATED APPLICATIONS

This application is a continuation of U.S. patent application Ser. No. 17/962,365 filed Oct. 7, 2022, which claims the benefit of U.S. Provisional Application No. 63/253,591 filed Oct. 8, 2021, which are incorporated herein in their entirety by reference.

TECHNICAL FIELD

The present systems, devices, and methods generally relate to systems, devices, and methods for selecting a subset of classifiers from a library of classifiers, and particularly relate to selecting classifiers based on characterized context.

BACKGROUND

Various systems and devices, such as robots, smartphones, smartglasses, and other technology benefit from contextual analysis of their environment. Such contextual analysis can be achieved with "classifiers", which are routines, algorithms, paradigms, models, or similar which when run identify specified objects or features in data. Specific object classifiers can be run to identify objects or features in an environment. For example, an APPLE classifier can be run on visual data to identify an apple or apples represented in the visual data. By running multiple classifiers, multiple objects or features can be identified. For example, multiple varieties of fruit could be identified in visual data by running multiple different fruit classifiers. To achieve broad environment and context analysis, it is desirable to run many classifiers, which can require extensive computational resources. It is desirable to provide a means for achieving broad contextual analysis, with less demand for computational resources.

BRIEF SUMMARY

According to a broad aspect, the present disclosure describes a method of operation of a robot system, the robot system comprising a robot body and a robot controller, wherein the robot controller comprises at least one processor and at least one non-transitory processor-readable storage medium communicatively coupled to the at least one processor, and wherein the at least one non-transitory processor-readable storage medium stores a library of classifiers, the method comprising: activating, by the robot controller, a first subset of classifiers from the library of classifiers; determining, by the robot controller, a first characterization of a context of the robot body, wherein determining the first characterization of the context of the robot body includes executing, by the robot controller, the first subset of classifiers from the library of classifiers; in response to determining the first characterization of the context of the robot body, selecting, by the robot controller, a second subset of classifiers from the library of classifiers based on the first characterization of the context of the robot body, the second subset of classifiers different from the first subset of classifiers; and activating, by the robot controller, the second subset of classifiers.

Selecting, by the robot controller, a second subset of classifiers from the library of classifiers based on the first characterization of the context of the robot body may include: selecting, by the robot controller, a second subset of classifiers from the library of classifiers that are expected to provide context information of the robot body which is additional to context information provided by the first subset of classifiers. Selecting, by the robot controller, a second subset of classifiers from the library of classifiers that are expected to provide context information of the robot body which is additional to context information provided by the first subset of classifiers may comprise: based on a relational model which defines probabilities of classifiers in the library of classifiers producing positive detection outputs based on outputs from active classifiers, selecting, by the robot controller, a second subset of classifiers from the library of classifiers that have a probability of positive detection which is within a probability range.

Selecting, by the robot controller, a second subset of classifiers from the library of classifiers based on the first characterization of the context of the robot body may include selecting, by the robot controller, a second subset of classifiers from the library of classifiers wherein each respective classifier in the second subset of classifiers is related to at least one respective classifier in the first subset of classifiers. The method may further comprise: selecting an additional subset of at least one classifier, wherein each respective classifier in the additional subset is unrelated to each of the classifiers in the first subset of classifiers; and activating, by the robot controller, the additional subset of at least one classifier.

Executing, by the robot controller, the first subset of classifiers from the library of classifiers may result in each respective classifier in the first subset of classifiers providing either a positive result or a negative result, and selecting, by the robot controller, the second subset of classifiers from the library of classifiers based on the first characterization of the context of the robot body may include selecting, by the robot controller, a second subset of classifiers from the library of classifiers wherein each respective classifier in the second subset of classifiers is related to at least one respective positive result of at least one respective classifier in the first subset of classifiers.

The method may further comprise: determining, by the robot controller, a second characterization of the context of the robot body, wherein determining the second characterization of the context of the robot body includes executing, by the robot controller, the second subset of classifiers from the library of classifiers, the second characterization of the context of the robot body including additional characterization information to the first characterization of the context of the robot body; in response to determining the second characterization of the context of the robot body, selecting, by the robot controller, a third subset of classifiers from the library of classifiers based on the second characterization of the context of the robot body, the third subset of classifiers different from the second subset of classifiers; and activating, by the robot controller, the third subset of classifiers. The method may further comprise: determining, by the robot controller, at least one additional characterization of the context of the robot body, each respective additional characterization of the context of the robot body including additional characterization information to a respective immediately preceding characterization of the context of the robot body, wherein determining each respective additional characterization of the context of the robot body includes executing, by the robot controller, a respective additional subset of classifiers from the library of classifiers; in response to determining each respective additional characterization of the context of the robot body, selecting, by the robot controller, a respective second additional subset of classifiers from the library of classifiers based on a respective additional characterization of the context of the robot body; and activating, by the robot controller, each respective additional subset of classifiers. Selecting, by the robot controller, a respective additional subset of classifiers from the library of classifiers may comprise: selecting, by the robot controller, each additional subset of classifiers from the library of classifiers based on a relational model which defines relationships between classifiers in the library of classifiers; the method may further comprise after executing, by the robot controller, a respective additional subset of classifiers from the library of classifiers: adjusting the relational model based on outputs from executing the respective additional subset of classifiers. The relational model may be a probability model which defines probabilities of classifiers in the library of classifiers producing positive detection outputs based on outputs from active classifiers. Adjusting the relational model based on outputs from executing the respective additional subset of classifiers may comprise: increasing respective probability values for classifiers in the library of classifiers related to outputs from an immediately preceding subset of classifiers, for classifiers which produced positive detection outputs. Adjusting the relational model based on outputs from executing the respective additional subset of classifiers may comprise: decreasing respective probability values for classifiers related to outputs from an immediately preceding subset of classifiers, for classifiers which produced negative detection outputs.

The method may further comprise disabling at least one classifier of the first subset of classifiers after determining the first characterization.

The at least one non-transitory processor-readable storage medium of the robot controller may stores the library of classifiers remote from the robot body; and the method may further comprise accessing, by a communication interface of the robot body, the first subset of classifiers on the non-transitory processor-readable storage medium remote from the robot body.

The at least one processor of the robot controller may include a first processor carried by the robot body, and a second processor remote from the robot body; the at least one non-transitory processor-readable storage medium of the robot controller may include a first non-transitory processor-readable storage medium carried by the robot body, and a second non-transitory processor-readable storage medium which stores the library of classifiers remote from the robot body; executing, by the robot controller, the first subset of classifiers from the library of classifiers may comprise executing, by the first processor, the first subset of classifiers from the library of classifiers. Activating the first subset of classifiers may comprise transferring, by a communication interface, the first subset of classifiers from the second non-transitory processor-readable storage medium to the first non-transitory processor-readable storage medium. The method may further comprise removing at least one classifier of the first subset of classifiers from the first non-transitory processor-readable storage medium after determining the first characterization. Activating, by the robot controller, a first subset of classifiers from the library of classifiers may comprise: activating, by the first processor, the first subset of classifiers from the library of classifiers; and determining, by the robot controller, a first characterization of a context of the robot body may comprise: determining, by the first processor, a first characterization of a context of the robot body. Selecting, by the robot controller, a second subset of classifiers from the library of classifiers based on the first characterization of the context of the robot body may comprise: selecting, by the second processor, a second subset of classifiers from the library of classifiers based on the first characterization of the context of the robot body. Activating, by the robot controller, the second subset of classifiers may comprise activating, by the first processor, the second subset of classifiers. Activating the second subset of classifiers may comprise transferring, by a communication interface, the second subset of classifiers from the second non-transitory processor-readable storage medium to the first non-transitory processor-readable storage medium. The method may further comprise transferring, by a communication interface, outputs from executing the first subset of classifiers to the second processor; and determining, by the robot controller, a first characterization of a context of the robot body may comprise: determining, by the second processor, a first characterization of a context of the robot body based on the outputs from executing the first subset of classifiers.

The robot controller may be carried by the robot body.

The robot controller may be remote from the robot body; the robot controller may be communicatively coupled to the robot body by a communications interface; the method may further comprise receiving, by the robot controller via the communications interface, context data from the robot body; and the method may further comprise sending, by the robot controller via the communications interface, action instructions to be received by the robot body.

The robot body may carry at least one sensor; the method may further comprise capturing, by the at least one sensor, sensor data representing an environment of the robot body; and executing, by the robot controller, the first subset of classifiers from the library of classifiers may comprise: executing, by the robot controller, the first subset of classifiers from the library of classifiers on the sensor data. The robot system may further comprise a user interface; the method may further comprise receiving, by the user interface, input indicating at least one task to be performed by the robot body; and selecting, by the robot controller, a second subset of classifiers from the library of classifiers based on the first characterization of the context of the robot body may further include: selecting, by the robot controller, the second subset of classifiers from the library of classifiers further based on the input indicating at least one task to be performed by the robot body.

According to another broad aspect, the present disclosure describes a robot system comprising: a robot body; a robot controller comprising at least one processor and at least one non-transitory processor-readable storage medium communicatively coupled to the at least one processor, the at least one non-transitory processor-readable storage medium storing processor-executable instructions that, when executed by the at least one processor, cause the robot system to: activate, by the robot controller, a first subset of classifiers from the library of classifiers; determine, by the robot controller, a first characterization of a context of the robot body, wherein the processor-executable instructions that cause the robot controller to determine the first characterization of the context of the robot body cause the robot controller to execute the first subset of classifiers from the library of classifiers; select, by the robot controller, a second subset of classifiers from the library of classifiers based on the first characterization of the context of the robot body, the second subset of classifiers different from the first subset of classifiers; and activate, by the robot controller, the second subset of classifiers.

The processor-executable instructions which cause the robot controller to select a second subset of classifiers from the library of classifiers based on the first characterization of the context of the robot body may cause the robot controller to: select the second subset of classifiers from the library of classifiers that are expected to provide context information of the robot body which is additional to context information provided by the first subset of classifiers. The processor-executable instructions which cause the robot controller to select a second subset of classifiers from the library of classifiers that are expected to provide context information of the robot body which is additional to context information provided by the first subset of classifiers may cause the robot controller to: based on a relational model which defines probabilities of classifiers in the library of classifiers producing positive detection outputs based on outputs from active classifiers, select a second subset of classifiers from the library of classifiers that have a probability of positive detection which is within a probability range. The processor-executable instructions which cause the robot controller to select a second subset of classifiers from the library of classifiers based on the first characterization of the context of the robot body may cause the robot controller to: select the second subset of classifiers from the library of classifiers wherein each respective classifier in the second subset of classifiers is related to at least one respective classifier in the first subset of classifiers. The processor-executable instructions may further cause the robot controller to: select an additional subset of at least one classifier, wherein each respective classifier in the additional subset is unrelated to each of the classifiers in the first subset of classifiers; and activate the additional subset of at least one classifier.

The processor-executable instructions which cause the robot controller to execute the first subset of classifiers from the library of classifiers may result in each respective classifier in the first subset of classifiers providing either a positive result or a negative result; and the processor-executable instructions which cause the robot controller to select a second subset of classifiers from the library of classifiers based on the first characterization of the context of the robot body may cause the robot controller to: select the second subset of classifiers from the library of classifiers wherein each respective classifier in the second subset of classifiers is related to at least one respective positive result of at least one respective classifier in the first subset of classifiers.

The processor-executable instructions may further cause the robot controller to: determine a second characterization of the context of the robot body, which includes causing the robot controller to: execute the second subset of classifiers from the library of classifiers, the second characterization of the context of the robot body including additional characterization information to the first characterization of the context of the robot body; select a third subset of classifiers from the library of classifiers based on the second characterization of the context of the robot body, the third subset of classifiers different from the second subset of classifiers; and activate the third subset of classifiers. The processor-executable instructions may further cause the robot controller to: determine at least one additional characterization of the context of the robot body, each respective additional characterization of the context of the robot body including additional characterization information to a respective immediately preceding characterization of the context of the robot body, wherein the processor-executable instructions which cause the robot controller to determine that at least one additional characterization of the context of the robot body may cause the robot controller to: execute a respective additional subset of classifiers from the library of classifiers for each respective additional characterization of the context of the robot body; select a respective second additional subset of classifiers from the library of classifiers based on a respective additional characterization of the context of the robot body; and activate each respective additional subset of classifiers. The processor-executable instructions which cause the robot controller to select a respective additional subset of classifiers from the library of classifiers may cause the robot controller to: select each additional subset of classifiers from the library of classifiers based on a relational model which defines relationships between classifiers in the library of classifiers; the processor-executable instructions may further cause the robot controller to, after executing a respective additional subset of classifiers from the library of classifiers: adjust the relational model based on outputs from executing the respective additional subset of classifiers. The relational model may be a probability model which defines probabilities of classifiers in the library of classifiers producing positive detection outputs based on outputs from active classifiers. The processor-executable instructions which cause the robot controller to adjust the relational model based on outputs from executing the respective additional subset of classifiers may cause the robot controller to: increase respective probability values for classifiers in the library of classifiers related to outputs from an immediately preceding subset of classifiers, for classifiers which produced positive detection outputs. The processor-executable instructions which cause the robot controller to adjust the relational model based on outputs from executing the respective additional subset of classifiers may cause the robot controller to: decrease respective probability values for classifiers which, based on outputs from an immediately preceding subset of classifiers, produced negative detection outputs.

The processor-executable instructions may further cause the robot controller to disable at least one classifier of the first subset of classifiers after determining the first characterization.

The at least one non-transitory processor-readable storage medium of the robot controller may include a non-transitory processor-readable storage medium remote from the robot body which stores the library of classifiers; and the robot body may comprise a communication interface; and the processor-executable instructions may further cause the communication interface to access the first subset of classifiers on the non-transitory processor-readable storage medium remote from the robot body.

The at least one processor of the robot controller may include a first processor carried by the robot body, and a second processor remote from the robot body; the at least one non-transitory processor-readable storage medium of the robot controller may includes a first non-transitory processor-readable storage medium carried by the robot body, and a second non-transitory processor-readable storage medium remote from the robot body which stores the library of classifiers; the processor-executable instructions which cause the robot controller to execute the first subset of classifiers from the library of classifiers may cause the first processor to execute the first subset of classifiers from the library of classifiers. The robot body may comprises a communication interface; the processor-executable instructions which cause the robot controller to activate the first subset of classifiers may cause: the communication interface to transfer the first subset of classifiers from the second non-transitory processor-readable storage medium to the first non-transitory processor-readable storage medium. The processor-executable instructions may further cause the robot controller to remove at least one classifier of the first subset of classifiers from the first non-transitory processor-readable storage medium after the first characterization is determined. The processor-executable instructions which cause the robot controller to activate a first subset of classifiers from the library of classifiers may cause the first processor to activate the first subset of classifiers from the library of classifiers; and the processor-executable instructions which cause the robot controller to determine a first characterization of a context of the robot body may cause the first processor to determine the first characterization of a context of the robot body. The processor-executable instructions which cause the robot controller to select a second subset of classifiers from the library of classifiers based on the first characterization of the context of the robot body may cause the second processor to select the second subset of classifiers from the library of classifiers based on the first characterization of the context of the robot body. The processor-executable instructions which cause the robot controller to activate the second subset of classifiers may cause the first processor to activate the second subset of classifiers. The robot body may comprise a communication interface; the processor-executable instructions which cause the robot controller to activate the second subset of classifiers may cause the communication interface to transfer the second subset of classifiers from the second non-transitory processor-readable storage medium to the first non-transitory processor-readable storage medium. The robot body may comprise a communication interface; the processor-executable instructions may further cause the communication interface to transfer outputs from executing the first subset of classifiers to the second processor; and the processor-executable instructions which cause the robot controller to determine a first characterization of a context of the robot body may cause the second processor to determine the first characterization of a context of the robot body based on the outputs from executing the first subset of classifiers.

The robot controller may be carried by the robot body.

The robot controller may be remote from the robot body; the robot controller may be communicatively coupled to the robot body by a communication interface; the processor-executable instructions may further cause the robot controller to receive, via the communications interface, context data from the robot body; and the processor-executable instructions may further cause the robot controller to send, via the communications interface, action instructions to be received by the robot body.

The robot body may include at least one sensor; the processor-executable instructions may further cause the at least one sensor to capture sensor data representing an environment of the robot body; and the processor-executable instructions which cause the robot controller to execute the first subset of classifiers from the library of classifiers may cause the robot controller to: execute the first subset of classifiers from the library of classifiers on the sensor data. The robot system may further comprise a user interface; the processor-executable instructions may cause the user interface to provide, to the robot controller, a received user input indicating at least one task to be performed by the robot body; and the processor-executable instructions which cause the robot controller to select a second subset of classifiers from the library of classifiers based on the first characterization of the context of the robot body may cause the robot controller to: select the second subset of classifiers from the library of classifiers further based on the user input indicating at least one task to be performed by the robot body.

BRIEF DESCRIPTION OF THE SEVERAL VIEWS OF THE DRAWINGS

The various elements and acts depicted in the drawings are provided for illustrative purposes to support the detailed description. Unless the specific context requires otherwise, the sizes, shapes, and relative positions of the illustrated elements and acts are not necessarily shown to scale and are not necessarily intended to convey any information or limitation. In general, identical reference numbers are used to identify similar elements or acts.

FIG. 1 is a front view of an exemplary robot body which approximates human anatomy in accordance with the present systems, devices, and methods.

FIG. 2 is an elevated side view of a robot body which does not approximate human anatomy in accordance with the present systems, devices, and methods.

FIG. 3 is a schematic diagram illustrating a robot body and a remote device, which together can be considered as a "robot" in accordance with the present systems, devices, and methods.

DETAILED DESCRIPTION

Figure 4:
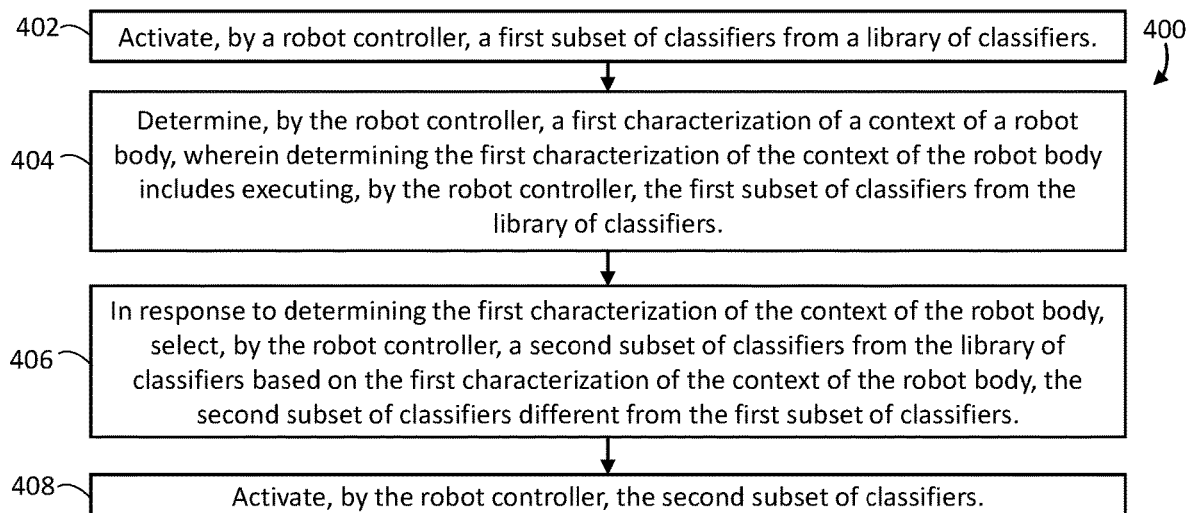
FIG. 4 is a flowchart diagram showing an exemplary method of operation of a robot or robot system which includes a robot controller in accordance with the present systems, devices, and methods.

The following description sets forth specific details in order to illustrate and provide an understanding of the various implementations and embodiments of the present systems, robots, and methods. A person of skill in the art will appreciate that some of the specific details described herein may be omitted or modified in alternative implementations and embodiments, and that the various implementations and embodiments described herein may be combined with each other and/or with other methods, components, materials, etc. in order to produce further implementations and embodiments.

In some instances, well-known structures and/or processes associated with computer systems and data processing have not been shown or provided in detail in order to avoid unnecessarily complicating or obscuring the descriptions of the implementations and embodiments.

Unless the specific context requires otherwise, throughout this specification and the appended claims the term "comprise" and variations thereof, such as "comprises" and "comprising," are used in an open, inclusive sense to mean "including, but not limited to."

Unless the specific context requires otherwise, throughout this specification and the appended claims the singular forms "a," "an," and "the" include plural referents. For example, reference to "an embodiment" and "the embodiment" include "embodiments" and "the embodiments," respectively, and reference to "an implementation" and "the implementation" include "implementations" and "the implementations," respectively. Similarly, the term "or" is generally employed in its broadest sense to mean "and/or" unless the specific context clearly dictates otherwise.

The headings and Abstract of the Disclosure are provided for convenience only and are not intended, and should not be construed, to interpret the scope or meaning of the present systems, devices, and methods.

The various embodiments described herein provide systems, devices, and methods for selecting environment classifiers, and particularly relate to selecting classifiers based on characterized context.

FIG. 1 is a front view of an exemplary robot system 100 in accordance with one implementation. In the illustrated example, robot system 100 includes a robot body that is designed to approximate human anatomy, including a torso 110 coupled to a plurality of components including head 111, right arm 112, right leg 113, left arm 114, and left leg 115 which approximate anatomical features. More or fewer anatomical features could be included as appropriate for a given application. Further, how closely a robot approximates human anatomy can also be selected as appropriate for a given application.

Each of components 110, 111, 112, 113, 114, 115 can be actuatable relative to other components. Actuators, motors, or other movement devices can couple together actuatable components. Driving said actuators, motors, or other movement driving mechanism causes actuation of the actuatable components. For example, rigid limbs in a humanoid robot can be coupled by motorized joints, where actuation of the rigid limbs is achieved by driving movement in the motorized joints.

Robot system 100 in FIG. 1 includes a robot body 101 that closely approximates human anatomy, such that input to or control of robot system 100 can be provided by an operator performing an action, to be replicated by the robot body 101. In some implementations, it is possible to even more closely approximate human anatomy, such as by inclusion of actuatable components in a face on the head 111 of robot body 101, or with more detailed design of hands or feet of robot body 101, as non-limiting examples. However, in other implementations a complete approximation of the human anatomy is not required, and a robot body may only approximate a portion of human anatomy. As non-limiting examples, only an arm of human anatomy, only a head or face of human anatomy; or only a leg of human anatomy could be approximated.

Robot system 100 also includes sensors 120, 122, 124, and 126, which collect context data representing an environment of robot body 101. In the example, sensors 120 and 122 are image sensors (e.g. cameras) that capture visual data representing an environment of robot body 101. Although two image sensors 120 and 122 are illustrated, more or fewer image sensors could be included. Also in the example, sensors 124 and 126 are audio sensors (e.g. microphones) that capture audio data representing an environment of robot body 101. Although two audio sensors 124 and 126 are illustrated, more or fewer audio sensors could be included. Two types of sensors are illustrated in the example of FIG. 1, more or fewer sensor types could be included. For example, only one of image sensors or audio sensors could be included. As another example, other sensor types, such as tactile sensors, accelerometers, inertial sensors, gyroscopes, temperature sensors, humidity sensors, radiation sensors, or any other appropriate types of sensors could be included. Further, although sensors 120 and 122 are shown as approximating human eyes, and sensors 124 and 126 are shown as approximating human ears, sensors 120, 122, 124, and 126 could be positioned in any appropriate locations.

Robot system 100 is also illustrated as including at least one processor 131, communicatively coupled to at least one non-transitory processor-readable storage medium 132. The at least one processor 131 can control actuation of components 110, 111, 112, 113, 114, and 115; can receive and process data from sensors 120, 122, 124, and 126; and can perform environmental characterization as discussed later with reference to FIGS. 4 and 5. The at least one non-transitory processor-readable storage medium 132 can have processor-executable instructions stored thereon, which when executed by the at least one processor 131 can cause robot system 100 to perform any of the methods discussed herein (e.g. method 400 in FIG. 4 and method 500 in FIG. 5). Further, the at least one non-transitory processor-readable storage medium 132 can store sensor data, classifiers, or any other data as appropriate for a given application. The at least one processor 131 and the at least one processor-readable storage medium 132 together can be considered as components of a "robot controller" 130, in that they control operation of robot system 100 in some capacity. While the at least one processor 131 and the at least one processor-readable storage medium 132 can perform all of the respective functions described in this paragraph, this is not necessarily the case, and the "robot controller" 130 can be or further include components that are remote from robot body 101. In particular, certain functions can be performed by at least one processor or at least one non-transitory processor-readable storage medium remote from robot body 101, as discussed later with reference to FIG. 3.

It is possible for a robot body to not approximate human anatomy. FIG. 2 is an elevated side view of a robot system 200 including a robot body 201 which does not approximate human anatomy. Robot body 201 includes a base 210, having actuatable components 211, 212, 213, and 214 coupled thereto. In the example, actuatable components 211 and 212 are wheels which provide movement capabilities to the robot body 201. Actuatable components 213 and 214 are a support arm and a tray, respectively. In other examples, other actuatable components could be included.

Robot system 200 also includes sensor 220, which is illustrated as an image sensor. The description pertaining to sensors 120, 122, 124, and 126 in FIG. 1 is also applicable to sensor 220 in FIG. 2 (and is applicable to inclusion of sensors in robot bodies in general).

Robot system 200 is also illustrated as including a local or on-board robot controller 230 comprising at least one processor 231 communicatively coupled to at least one non-transitory processor-readable storage medium 232. The at least one processor 231 can control actuation of components 210, 211, 212, 213, and 214; can receive and process data from sensor 220; and can perform environmental context characterization as discussed later with reference to FIGS. 4 and 5. The at least one non-transitory processor-readable storage medium 232 can store processor-executable instructions that, when executed by the at least one processor 231, can cause robot body 201 to perform any of the methods discussed herein (e.g. method 400 in FIG. 4 and method 500 in FIG. 5). Further, the at least one processor-readable storage medium 232 can store sensor data, classifiers, or any other data as appropriate for a given application.

FIG. 3 is a schematic diagram illustrating components of a robot system 300 comprising a robot body 301 and a physically separate remote device 350 in accordance with the present systems, devices, and methods.

Robot body 301 is shown as including at least one local or on-board processor 302, a non-transitory processor-readable storage medium 304, a wireless communication interface 306, a wired communication interface 308, at least one actuatable component 310, and at least one sensor 312. However, certain components could be omitted or substituted, or elements could be added, as appropriate for a given application. For example, in implementations where classifiers are stored on remote device 350, robot body 301 may not need non-transitory processor-readable storage medium 304 with which to store said classifiers. As another example, in many implementations only one communication interface is needed, so robot body 301 may include only one of wireless communication interface 306 or wired communication interface 308. Further, any appropriate structure of at least one actuatable portion could be implemented as the actuatable component 310 (such as those shown in FIGS. 1 and 2, for example). Further still, the at least one sensor 312 can include any appropriate quantity or type of sensor, as discussed with reference to FIGS. 1 and 2.

Remote device 350 is shown as including at least one processor 352, at least one non-transitory processor-readable medium 354, a wireless communication interface 356, a wired communication interface 308, at least one input device 358, and an output device 360. However, certain components could be omitted or substituted, or elements could be added, as appropriate for a given application. As an example, in many implementations only one communication interface is needed, so remote device 350 may include only one of wireless communication interface 356 or wired communication interface 308. As another example, input device 358 can receive input from an operator of remote device 350, and output device 360 can provide information to the operator, but these components are not essential in all implementations. For example, remote device 350 can be a server which communicates with robot body 301, but does not require operator interaction to function. Additionally, output device 360 is illustrated as a display, but other output devices are possible, such as speakers, as a non-limiting example. Similarly, the at least one input device 358 is illustrated as a keyboard and mouse, but other input devices are possible.

In some implementations, the at least one processor 302 and the at least one processor-readable storage medium 304 together can be considered as a "robot controller", which controls operation of robot body 301. In other implementations, the at least one processor 352 and the at least one processor-readable storage medium 354 together can be considered as a "robot controller" which controls operation of robot body 301 remotely. In yet other implementations, that at least one processor 302, the at least one processor 352, the at least one non-transitory processor-readable storage medium 304, and the at least one processor-readable storage medium 354 together can be considered as a "robot controller" (distributed across multiple devices) which controls operation of robot body 301. "Controls operation of robot body 301" refers to the robot controller's ability to provide instructions for operation of the robot body 301 to the robot body 301. In some implementations, such instructions could be explicit instructions which control specific actions of the robot body 301. In other implementations, such instructions could include broader instructions which instruct the robot body 301 generally, where specific actions of the robot body 301 are controlled by a control unit of the robot body 301 (e.g. the at least one processor 302), which converts the broad instructions to specific action instructions. In some implementations, a single remote device 350 may communicatively link to and at least partially control multiple (i.e., more than one) robot bodies. That is, a single remote device 350 may serve as (at least a portion of) the respective robot controller for multiple physically separate robot bodies 301.

FIG. 4 is a flowchart diagram showing an exemplary method 400 of operation of a robot system which includes a robot body and a robot controller in accordance with the present systems, devices, and methods. Method 400 as illustrated includes four acts 402, 404, 406, and 408, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. A robot system which can be operated in accordance with method 400 comprises a robot body (such as any of robot bodies 101, 201, or 301 discussed with reference to FIGS. 1, 2, and 3) and a robot controller (e.g., 130, 230; which can be carried by the robot body as discussed with reference to FIGS. 1 and 2, or can be remote from the robot body, as discussed with reference to remote device 350 in FIG. 3). The robot controller in turn includes at least one processor (such as any of processors 131, 231, 302, and 352 discussed with reference to FIGS. 1, 2, and 3) and a non-transitory processor-readable storage medium (such as any of non-transitory processor-readable storage mediums 132, 232, 304, and 354 discussed with reference to FIGS. 1, 2, and 3) communicatively coupled to the at least one processor. The at least one processor-readable storage medium can store processor-executable instructions that, when executed by at the at least one processor, cause the robot system to perform the method 400. The at least one non-transitory processor-readable storage medium stores a library of classifiers. The library of classifiers can be a large plurality of classifiers; so large that executing or locally storing each classifier of the library of classifiers is undesirable or impractical in terms of computational demand (e.g. executing each of the classifiers of the library of classifiers would be too slow or consume too much power for a desired application, or locally storing each of the classifiers of the library of classifiers would occupy too much space on a non-transitory processor-readable storage medium of the robot body).

At act 402, the robot controller activates a first subset of classifiers from the library of classifiers. As used herein, a "subset" of classifiers of the library of classifiers includes fewer classifiers than the entire library of classifiers, and is less computationally demanding to execute and/or occupies less storage space than the entire library of classifiers.

At act 404, the robot controller determines a first characterization of a context of the robot body. Determining this first characterization of the context of the robot body includes executing, by the robot controller, the first subset of classifiers from the library of classifiers. For example, results from executing the first subset of classifiers can include positive detection for certain classifiers and negative detection for other classifiers, or a number of objects/features detected by a given classifier. "Positive detection" by a classifier refers to identification of an object or feature which the particular classifier is designed or otherwise well-suited to detect. "Negative detection" by a classifier refers to a lack of identification of an object or feature which the particular classifier is designed or otherwise well-suited to detect. "Negative detection" does not necessarily mean that the object or feature is present but was not identified correctly, but rather means the object or feature was not identified (whether it is present or not). Such results are indicative of a context of the robot body. For example, if a "SKY" classifier results in positive detection of sky, it is likely that a context of the robot body is "outdoors". In contrast, if a "CEILING" classifier results in positive detection of a ceiling, is it likely that a context of the robot body is "indoors".

Some classifiers are binary, in that they indicate positive detection or negative detection of an object or feature (e.g., a binary "TREE" classifier can indicate that a tree is detected, or can indicate that a tree is not detected). Some classifiers can be non-binary, and provide more information than "positive detection" or "negative detection". For example, a non-binary "TREE" classifier could not only indicate that a tree was detected, but could indicate other information like how many trees are detected, or what species of tree is detected. This description generally describes binary classifiers for ease of discussion, but any appropriate amount of non-binary classifiers could be included in any library of classifiers or subset of classifiers described herein.

At act 406, in response to determining the first characterization of the context of the robot body, the robot controller selects a second subset of classifiers from the library of classifiers based on the first characterization of the context of the robot body. The second subset of classifiers is different from the first subset of classifiers.

In some implementations, classifiers in the library of classifiers can be arranged in a hierarchy, where positive or negative detection by certain classifiers in one layer of the hierarchy is indicative of what classifiers in another layer of the hierarchy should be activated (in some examples, classifiers which are more likely to produce positive detections should be activated, though other examples are possible). As one example, if the first characterization of the context indicates that the robot body is indoors (e.g. by positive detection by the "CEILING" classifier), the second subset of classifiers can be selected to focus on classifiers which further refine "indoors" characterizations; in contrast, if the first characterization indicates that the robot body is outdoors (e.g. by positive detection by the "SKY" classifier), the second subset of classifiers can be selected to focus on classifiers which further refine "outdoors" characterizations. As non-limiting examples, "indoors" focused classifiers could identify furniture, and "outdoors" focused classifiers could identify trees. Many other example classifiers could be implemented which identify many other objects or features associated with indoors or outdoors.

In other implementations, a probability model can be used which defines probabilistic relationships between classifiers, where positive or negative detection by certain classifiers informs probabilities of other classifiers producing positive or negative results. As one example, if the first characterization of context indicates that the robot body is indoors (e.g. by positive detection by the "CEILING" classifier), probabilities of indoors-related classifiers producing positive detection will be increased; in contrast, if the first characterization indicates that the robot body is outdoors (e.g. by positive detection by the "SKY" classifier), probabilities of outdoors-related classifiers producing positive detection will be increased. Such a probability model can be trained by machine learning over time. Probability models are discussed in detail later.

Selection of the second subset of classifiers is not limited to selecting classifiers which are likely to produce positive detection. Context of the robot body can be informed by negative detections as well (by process of deduction). As a non-limiting example, negative detection by a "CARPET" classifier can be indicative of a sterile environment (though is not exclusively indicative of this). Paired with outputs of other classifiers, negative detection by the "CARPET" classifier meaningfully characterizes context.

At act 408, the robot controller activates the second subset of classifiers. Depending on the size of the library of classifiers and how the library is organized, in some implementations the robot body can take action or perform automated tasks based on results of the second set of classifiers. In other implementations, additional environmental characterizations can be determined, and additional subsets of classifiers selected, to iteratively refine context characterization and selection of classifier subsets.

By executing a first subset of classifiers, computational demand is reduced compared to executing the entire library of classifiers, and thus context of the robot body can be characterized to an extent (the first characterization), which informs selection of the second subset of classifiers. This process can be repeated: characterizing a context of the robot body by executing a subset of classifiers, and selecting a refined subset of classifiers to execute, which in turn provide a refined characterization of the environmental context of the robot body, which can be used to select another subset of classifiers to execute. That is, instead of executing the entire library of classifiers at once, subsets of classifiers can be executed in sequence to iteratively refine characterization of context of the robot data, to arrive at a specific context for which specific classifiers can be executed, according to which the robot body can take action or perform automated tasks. By executing and refining subsets of classifiers in sequence, only appropriate classifiers can be executed, such that the entire library of classifiers does not need to be executed, and overall computational demand is reduced. Further, the entire library of classifiers does not need to be stored on any local non-transitory processor-readable medium component of the robot controller, but rather can be stored remotely, with subsets of classifiers being transferred or accessed as needed. Thereby storage space on any local non-transitory processor-readable medium component of the robot controller is reduced.

In an exemplary first implementation, at act 406, selecting, by the robot controller, a second subset of classifiers from the library of classifiers based on the first characterization of the context of the robot body can include: selecting, by the robot controller, a second subset of classifiers from the library of classifiers that are expected to provide context information of the robot body which is additional to context information provided by the first subset of classifiers. What is meant by "expected to provide context information . . . which is additional" is that the second subset of classifiers are expected (according to a relational model of the library of classifiers, such as a hierarchy or probability model) to provide information which meaningfully refines characterization of context of the robot body. That is, the second characterization should be meaningfully refined compared to the first characterization. As an example, based on a relational model which defines probabilities of classifiers in the library of classifiers producing positive detection outputs based on outputs from active classifiers, the second subset of classifiers can be selected from the library of classifiers by the robot controller to include classifiers that have a probability of positive detection which is within a probability range. That is, classifiers with extreme probabilities of positive or negative detection (based on the first characterization) which are outside the probability range are determined as not meaningfully refining characterization, and thus may not be selected in the second subset of classifiers. Such a probability range can be application specific. In an example, the probability range could be 1% to 99% chance of positive detection. Classifiers with less than 1% or greater than 99% probability of positive detection could be considered as not being expected to provide meaningful additional context information, because the characterized environmental context is almost certainly the same regardless of whether these classifiers are active or not. Further, even if a classifier with a probability of detection outside of the probability range were to produce an unexpected result (e.g., a classifier with a less than 1% of producing positive detection ends up producing a positive detection), such a situation is likely an edge case which is not readily characterizable and thus still does not meaningfully refine characterization of context. The probability range of 1% to 99% chance of positive detection is merely exemplary, and any appropriate probability range could be set as appropriate for a given application. As an illustrative exemplary scenario, if the first characterization indicates the robot body is outdoors, classifiers which identify surgical equipment are likely outside of the probability range, because surgical equipment is almost certainly not going to be identified outdoors. Even if surgical equipment were found, this is likely an edge case which doesn't correspond to a categorizable environmental context (e.g. someone dropped a pair of forceps on the ground).

In an exemplary second implementation, at act 406, selecting, by the robot controller, a second subset of classifiers from the library of classifiers based on the first characterization of the context of the robot body can include: selecting, by the robot controller, a second subset of classifiers from the library of classifiers wherein each respective classifier in the second subset of classifiers is related to at least one respective classifier in the first subset of classifiers. As an example, if the first characterization indicates that the context of the robot body is indoors, the second subset of classifiers can be selected to include classifiers for objects or features found indoors. If the first characterization indicates that the context of the robot body is outdoors, the second subset of classifiers can be selected to include classifiers for objects or features found outdoors. Whether or not classifiers are "related" to other classifiers can be determined from a relational model, where certain classifiers are linked to other classifiers, defining said classifiers as "related". Such linkages can be defined by a designer or implementer of the relational model, or can be determined and/or refined over time by a machine learning model, e.g., executed in real-time by the robot controller.

Further, method 400 can include additional acts, such as for example: (i) selecting an additional subset of at least one classifier, wherein each respective classifier in the additional subset is unrelated to each of the classifiers in the first subset of classifiers; and (ii) activating, by the robot controller, the additional subset of at least one classifier. Such unrelated classifiers can be selected to provide broader context characterization (compared to a set of strictly related classifiers). As one example, as context characterization is narrowed through successive selection of related classifiers, it may become difficult for the robot controller to identify or characterize any objects or features which do not fit in the relational model (i.e., are not expected within the narrowly determined context). Activating an additional set of unrelated classifiers can provide greater flexibility, by preventing the robot controller from becoming "trapped" in a narrowly defined context. In one exemplary scenario, if context of the robot body changes (e.g. due to the robot body moving, or due to the environment of the robot body being altered), the second subset of related classifiers may not be able to identify and respond to the change in context, because the second set of related classifiers was selected based on a relationship to a first context as characterized in the first characterization. Unrelated classifiers can be indicative of the context change, and result in the robot controller dynamically shifting characterization of context, or re-determining context characterization (e.g. starting again from the first subset of classifiers).

In an exemplary third implementation, at act 404, executing, by the robot controller, the first subset of classifiers from the library of classifiers can result in each respective classifier in the first subset of classifiers providing either a positive result or a negative result. Subsequently, at act 406, selecting, by the robot controller, a second subset of classifiers from the library of classifiers based on the first characterization of the context of the robot body includes: selecting, by the robot controller, the second subset of classifiers from the library of classifiers wherein each respective classifier in the second subset of classifiers is related to at least one respective positive result of at least one respective classifier in the first subset of classifiers. As an example, if a "CEILING" classifier in the first subset of classifiers positively detects a ceiling, the second subset of classifiers can be selected to include classifiers for objects or features related to contexts having a ceiling (i.e. indoors). As another example, if a "SKY" classifier in the first subset of classifiers positively detects sky, the second subset of classifiers can be selected to include classifiers for objects or features related to contexts having sky (i.e. outdoors). Whether or not classifiers are "related" to positive detections by other classifiers can be determined from a relational model, where certain classifiers are linked to other classifiers, and defined as "related" when the other classifiers produce positive detection. Such linkages can be defined by a designer or implementer of the relational model, or can be determined and/or refined over time by a machine learning model, e.g., executed in real-time by the robot controller.

Similar to as discussed above regarding the exemplary second implementation, in the exemplary third implementation method 400 can include additional acts, such as for example: (i) selecting an additional subset of at least one classifier, wherein each respective classifier in the additional subset is unrelated to each of the classifiers in the first subset of classifiers; and (ii) activating, by the robot controller, the additional subset of at least one classifier. The discussion of these acts pertaining to the exemplary second implementation is also applicable to the exemplary third implementation.

Figure 5:
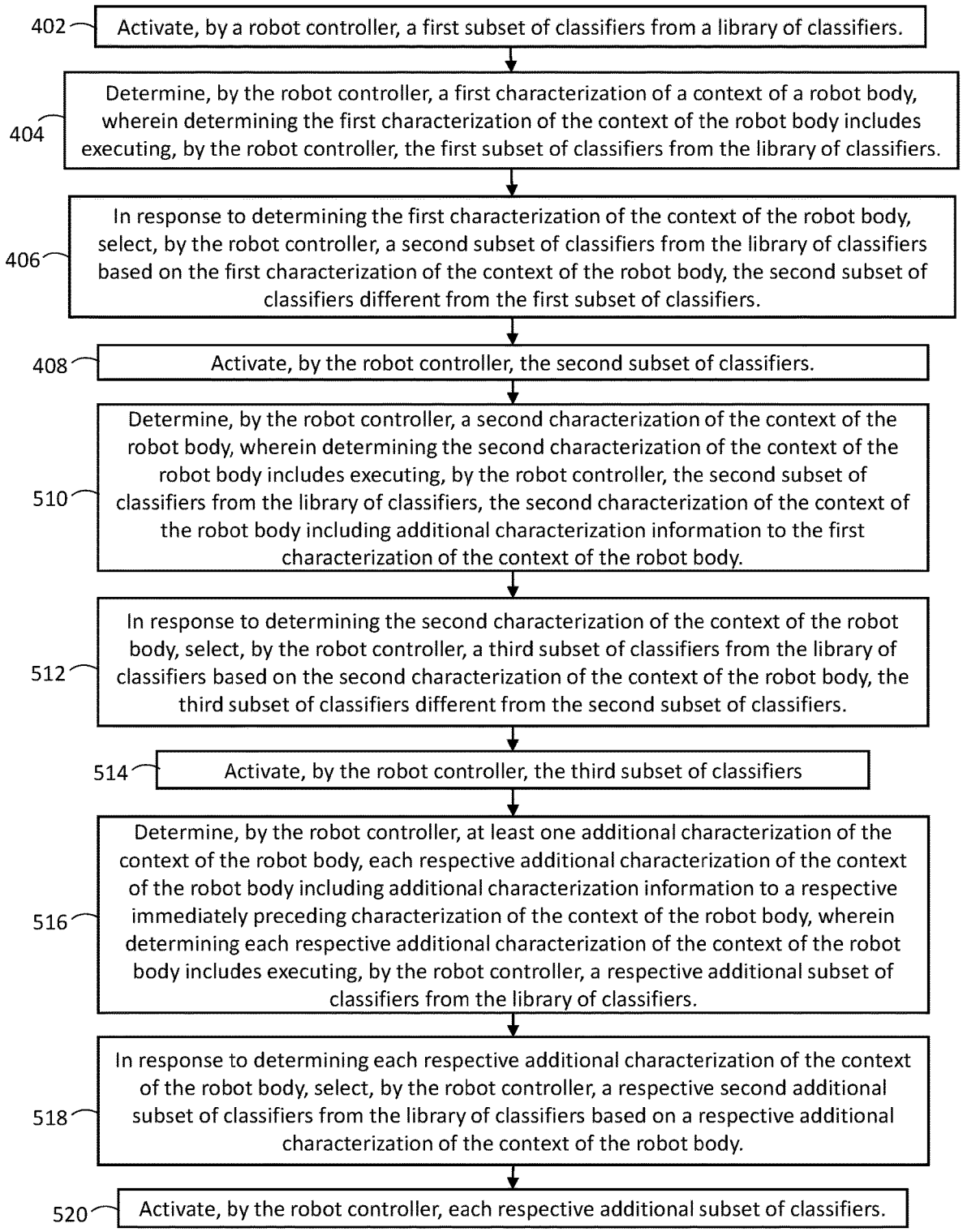
FIG. 5 is a flowchart diagram showing another exemplary method of operation of a robot or robot system which includes a robot controller in accordance with the present systems, devices, and methods.

FIG. 5 is a flowchart diagram showing an exemplary method 500 of operation of a robot or robot system which includes a robot controller in accordance with the present systems, devices, and methods. Method 500 as illustrated includes acts 402, 404, 406, 408, 510, 512, 514, 516, 518, and 520, though those of skill in the art will appreciate that in alternative implementations certain acts may be omitted and/or additional acts may be added. Those of skill in the art will also appreciate that the illustrated order of the acts is shown for exemplary purposes only and may change in alternative implementations. A robot or robot system which can be operated in accordance with method 500 comprises a robot body (such as any of robot bodies 101, 201, or 301 discussed with reference to FIGS. 1, 2, and 3) and a robot controller (which can be carried by the robot body as discussed with reference to FIGS. 1 and 2, or can be (or include components that are) remote from the robot body, as discussed with reference to remote device 350 in FIG. 3). The robot controller in turn includes at least one processor (such as any of processors 131, 231, 302, and 352 discussed with reference to FIGS. 1, 2, and 3) and a non-transitory processor-readable storage medium (such as any of non-transitory processor-readable storage mediums 132, 232, 304, and 354 discussed with reference to FIGS. 1, 2, and 3) communicatively coupled to the at least one processor. The at least one non-transitory processor-readable storage medium can store processor-executable instructions that, when executed by at the at least one processor, cause the robot or robot system to perform the method 500. The at least one non-transitory processor-readable storage medium stores a library of classifiers. The library of classifiers can be a large plurality of classifiers; so large that running each classifier of the library of classifiers simultaneously or concurrently is undesirable or impractical in terms of computational demand (e.g., running each of the classifiers of the library of classifiers would be too slow or consume too much power for a desired application, or storing each of the classifiers of the library of classifiers would occupy too much space on a non-transitory processor-readable storage medium of the robot controller).

Method 500 includes acts 402, 404, 406, and 408, as are included in act 400 discussed with reference to FIG. 4. Description of these acts with reference to FIG. 4 is also applicable to these acts in FIG. 5.

Method 500 further includes optional acts 510, 512, and 514, which relate to refining context characterization.

At act 510, the robot controller determines a second characterization of a context of the robot body. Determining this second characterization of the context of the robot body includes executing, by the robot controller, the second subset of classifiers from the library of classifiers. The second characterization of the context of the robot body includes additional characterization information to the first characterization of the context of the robot body. As an example, if at act 404 the first characterization was determined as "outdoors", the second characterization could be determined as "forest", based on results from executing a "TREE" classifier in the second subset of classifiers. As another example, if at act 404 the first characterization was determined as "indoors", the second characterization could be determined as "lavatory", based on results from executing a "TOILET" classifier in the second subset of classifiers.

At act 512, in response to determining the second characterization of the context of the robot body, the robot controller selects a third subset of classifiers from the library of classifiers based on the second characterization of the context of the robot body. The third subset of classifiers is different from the second subset of classifiers.

In the above example where the second characterization indicates that the context of the robot body is a forest (e.g. by positive detection or a plurality of detections by the "TREE" classifier), the third subset of classifiers can be selected to focus on classifiers which further refine "forest" characterizations. As examples, the third subset of classifiers could be classifiers directed to identifying species of trees, or identifying fires in a forest. In the above example where the second characterization indicates that the robot body is in a lavatory (e.g. by positive detection by the "TOILET" classifier), the third subset of classifiers can be selected to focus on classifiers which further refine "lavatory" characterizations. As examples, the third subset of classifiers could be classifiers directed to identifying types of equipment in lavatories, such as urinals, sinks, countertops, mirrors, or any other appropriate equipment.

Selection of the third subset of classifiers can be based on a hierarchical model, a probability model, or any other appropriate relational model between classifiers. Selection of the third subset of classifiers is not limited to selecting classifiers which are likely to produce positive detection. Context of the robot body can be informed by negative detections as well (by process of deduction), as discussed above with reference to FIG. 4.

At act 514, the robot controller activates the third subset of classifiers. Depending on the size of the library of classifiers and how the library is organized, in some implementations the robot body can take action or perform automated tasks based on results of the third set of classifiers.

Method 500 is also shown in FIG. 5 as including optional acts 516, 518, and 520, where additional environmental characterizations can be determined, and additional subsets of classifiers selected, to iteratively refine context characterization and selection of classifier subsets.

At act 516, the robot controller determines at least one additional characterization of a context of the robot body. Determining each respective additional characterization of the context of the robot body includes executing, by the robot controller, a respective additional subset of classifiers from the library of classifiers. Each respective additional characterization of the context of the robot body includes additional characterization information to a respective immediately preceding characterization of the context of the robot body. As an example, one additional characterization can be a third characterization of context of the robot body, determined by executing the third subset of classifiers activated at act 514. As further examples, other additional characterizations of context of the robot body can include a fourth, fifth, sixth, or even higher ordinal characterization of context of the robot body, determined based on execution of a respective fourth, fifth, sixth, or even higher ordinal subset of classifiers.

At act 518, in response to determining each respective additional characterization of the context of the robot body, the robot controller selects a respective second additional subset of classifiers from the library of classifiers based on a respective additional characterization of the context of the robot body. That is, for a given iteration, an additional characterization is determined based on execution of an additional subset of classifiers as at act 516, and at act 518 a second additional subset of classifiers is selected based on the determined additional characterization.

Selection of each respective additional subset of classifiers can be based on a hierarchical model, a probability model, or any other appropriate relational model between classifiers in the library of classifiers. Selection of each respective additional subset of classifiers is not limited to selecting classifiers which are likely to produce positive detection or which are related to previously active classifiers. Context of the robot body can be informed by negative detections as well (by process of deduction) and by introducing unrelated classifiers, as discussed above with reference to FIG. 4.

At act 520, the robot controller activates each respective additional subset of classifiers.

Acts 516, 518, and 520 are not necessarily performed strictly in the sequence shown in FIG. 5. Rather, acts 516, 518, and 520 can be performed repeatedly in a loop, with each loop defining a respective additional characterization of context of the robot body, based on executing a respective additional subset of classifiers which are determined based on, or in response to, an immediately preceding characterization of context of the robot body. Acts 516, 518, and 520 pertain to iteratively refining characterization of context of the robot body, by working through subsequently selected subsets of classifiers. That is, a subset of classifiers is executed to characterize context, characterization of context is used to select a new subset of classifiers, which are executed to provide a new characterization of context, and the new characterization is used to select yet another subset of classifiers, etcetera. This process can be repeated as many times as appropriate for a given application until characterization of context is refined to an event that the robot or robot system can perform desired actions or interactions based on the context. Even after context is characterized to this extent, characterization of context can continue to be refined or adjusted, to account for changing context, or to provide even more specific information which the robot or robot system can act on.

In any of the implementations discussed herein, an organizational model for the library of classifiers can be refined (e.g., in real-time by the robot controller) based on results from running subsets of classifiers. With reference to FIG. 5, selecting, by the robot controller, a respective additional subset of classifiers from the library of classifiers as at act 518 can comprise: selecting, by the robot controller, each additional subset of classifiers from the library of classifiers based on a relational model which defines relationships between classifiers in the library of classifiers. Method 500 can further include, after executing, by the robot controller, a respective additional subset of classifiers from the library of classifiers: adjusting the relational model based on outputs from executing the respective additional subset of classifiers. That is, a relational model between classifiers can be adjusted or updated based on results from executing subsets of classifiers selected based on said model. Thus, the relational model can be improved over time.

In one example, the relational model can be a probability model which defines probabilities of classifiers in the library of classifiers producing positive detection outputs based on outputs from active classifiers (a characterization of context). With such a model, an active subset of classifiers will produce positive or negative detection outputs, and a new subset of classifiers can be selected based on the probabilities of positive detection outputs (i.e., a new subset of classifiers is selected based on likelihood that the classifiers in the subset will produce positive detection). As discussed above regarding FIG. 4, higher probability of positive detection can, but does not necessarily, mean better characterization of context; rather, selecting classifiers with less certain outcomes (e.g. probabilities near 50%) can also provide meaningful context information. In the context of this example probability model, adjusting the relational model based on outputs from executing the respective additional subset of classifiers can comprise increasing respective probability values for classifiers in the library of classifiers related to outputs from an immediately preceding subset of classifiers, for classifiers which produced positive detection outputs. Likewise, adjusting the relational model based on outputs from executing the respective additional subset of classifiers can comprise decreasing respective probability values for classifiers related to outputs from an immediately preceding subset of classifiers, for classifiers which produced negative detection outputs. That is, for a given classifier which was selected based on its probability of positive detection based on positive detection by other classifiers, said probability of positive detection related to said other classifiers can be adjusted up or down based on whether the given classifiers results in positive or negative detection in the present instance. Probability values may thus be dynamically learned, e.g., by the robot controller, over time.

In the above-described methods, different subsets of classifiers are activated in response to characterizations of context of the robot body. To reduce computational resource burden, at least one of the previously activated classifiers can be disabled after determining a characterization, so that these classifiers no longer consume processing resources. For example, after determining the first characterization of the context of the robot body as at act 406 of methods 400 and 500 in FIGS. 4 and 5, at least one classifier of the first subset of classifiers can be disabled. Similarly, after the second characterization is determined at act 510 of method 500 in FIG. 5, at least one classifier of the second subset of classifiers can be disabled. Similarly, after the at least one additional characterization is determined at act 516 of method 500 in FIG. 5, at least one classifier of the respective additional subset of classifiers can be disabled.

In some implementations, "disabling" a classifier refers to making the classifier inactive, such that sensor data is not (or no longer) analyzed according to the classifier to identify objects or features which are the focus of the classifier. That is, a storage location of the classifier may not be altered, but execution or use of the classifier may be stopped. Such an implementation saves processing resources. In other implementations, "disabling" a classifier additionally can refer to deleting the classifier from memory. As discussed later, in some implementations classifiers can be transferred to a local non-transitory processor-readable storage medium on-board the robot body as needed; such classifiers can later be deleted from the local non-transitory processor-readable storage medium on-board the robot body when not needed, deactivated, or disabled. In addition to preserving processing resources, this also preserves storage resources.

Disabling at least one classifier of a subset of classifiers can entail disabling each classifier of the subset of classifiers, but this is not necessarily the case. It may be desirable to not disable certain classifiers in a subset. As one example, the first subset of classifiers in methods 400 and 500 in FIGS. 4 and 5 could include a "SKY" classifier, a "CEILING" classifier, as well as other classifiers. Even after determining the first characterization of context of the robot body as at act 406, the "SKY" classifier and the "CEILING" classifier may remain active while other classifiers in the first subset of classifiers are disabled, to detect changes in context, thus improving flexibility of the robot or robot system should a change occur in the sky/ceiling context of the robot body's environment.

In some implementations, at least one non-transitory processor-readable storage medium (e.g. non-transitory processor-readable storage medium 354 in FIG. 3) of the robot controller stores the library of classifiers remote from the robot body (e.g. robot body 301 in FIG. 3); and the method (e.g. method 400 or 500) further comprises accessing, by a communication interface of the robot body (e.g. wireless interface 306 or wired interface 308), the first subset of classifiers from the non-transitory processor-readable storage medium remote from the robot body. For example, the first subset of classifiers in methods 400 and 500, the second subset of classifiers in methods 400 and 500, or each additional subset of classifiers in method 500 can be accessed as-needed from the non-transitory processor-readable storage medium 354 remote from the robot body 301 via communication interface 306 or 308. In this way, the complete library of classifiers does not need to be stored on a local non-transitory processor-readable storage medium carried by the robot body (e.g. non-transitory processor-readable storage medium 304 in FIG. 3), since such a storage medium may have limited capacity.

As mentioned above with reference to FIGS. 1, 2, and 3, a robot system includes a robot controller and a robot body. The robot controller serves to control operation of the robot body, and comprises at least one processor and at least one non-transitory processor-readable storage medium. In some implementations, the robot body carries the robot controller. In other implementations, the robot controller is remote from the robot body. In yet other implementations, the robot controller is distributed, with at least a first processor and at least a first non-transitory processor-readable storage medium carried by the robot body, and at least a second processor and a second non-transitory processor-readable storage medium remote from the robot body. In methods 400 and 500 as discussed with reference to FIGS. 4 and 5, processing acts can be performed by the first processor, the second processor, or a combination of the first and second processors. Further, classifiers can be stored by the first non-transitory processor-readable storage medium, the second non-transitory processor-readable storage medium, or a combination of the first non-transitory processor-readable storage medium and the second non-transitory processor-readable storage medium. Several exemplary implementations are discussed below regarding where acts of methods 400 and 500 are performed, and where data is stored.

With reference to the example of FIG. 3, in an exemplary implementation where the robot controller is distributed as discussed above, the at least one processor of the robot controller includes a first processor carried by the robot body (e.g. the at least one processor 302 in FIG. 3), and a second processor remote from the robot body (e.g. the at least one processor 352 in FIG. 3); the at least one non-transitory processor-readable storage medium of the robot controller includes a first non-transitory processor-readable storage medium carried by the robot body (e.g. the at least one non-transitory processor-readable storage medium 304 in FIG. 3), and a second non-transitory processor-readable storage medium which stores the library of classifiers remote from the robot body (e.g. the at least one non-transitory processor readable storage medium 354).

In this exemplary distributed implementation, execution of classifiers can be performed by the first processor (e.g. that at least one processor 302 in FIG. 3). That is, execution of classifiers is handled locally at the robot body. For example, executing, by the robot controller, the first subset of classifiers from the library of classifiers at act 404 of methods 400 and 500 comprises executing, by the first processor, the first subset of classifiers from the library of classifiers. Similarly, executing, by the robot controller, the second subset of classifiers from the library of classifiers at act 510 of method 500 comprises executing, by the first processor, the second subset of classifiers from the library of classifiers. Similarly, executing, by the robot controller, a respective additional subset of classifiers from the library of classifiers at act 516 of method 500 comprises executing, by the first processor, the respective additional subset of classifiers from the library of classifiers.

Further in this exemplary distributed implementation, the method (e.g. method 400 in FIG. 4 or method 500 in FIG. 5) can optionally further comprise, prior to activating a subset of classifiers, transferring, by a communication interface (e.g. communication interface 306, 356, and/or 308), the subset of classifiers from the second non-transitory processor-readable storage medium (medium 354 in FIG. 3) to the first non-transitory processor-readable storage medium (medium 304 in FIG. 3). That is, the library of classifiers is stored remote from the robot body, and activating a subset of classifiers may include transferring the subset of classifiers to the robot body and executing the subset of classifiers by the first processor (e.g., 302 in FIG. 3) on-board the robot body. In this way, only the classifiers which are needed may be transferred and stored at the robot body, thereby preserving storage space at the robot body. As a specific example, activating the first subset of classifiers at act 402 of method 400 and method 500 can comprise transferring, by a communication interface (e.g. communication interface 306, 356, and/or 308), the first subset of classifiers from the second non-transitory processor-readable storage medium (e.g. non-transitory processor-readable storage medium 354) to the first non-transitory processor-readable storage medium (e.g. non-transitory processor-readable storage medium 304).

Similarly, activating the second subset of classifiers at act 408 of method 400 and method 500 can comprise transferring, by a communication interface (e.g. communication interface 306, 356, and/or 308), the second subset of classifiers from the second non-transitory processor-readable storage medium (e.g. non-transitory processor-readable storage medium 354) to the first non-transitory processor-readable storage medium (e.g. non-transitory processor-readable storage medium 304).

Similarly, activating the third subset of classifiers at act 514 of method 500 can comprise transferring, by a communication interface (e.g. communication interface 306, 356, and/or 308), the third subset of classifiers from the second non-transitory processor-readable storage medium (e.g. non-transitory processor-readable storage medium 354) to the first non-transitory processor-readable storage medium (e.g. non-transitory processor-readable storage medium 304). Similarly, activating each respective additional subset of classifiers at act 520 of method 500 can comprise transferring, by a communication interface (e.g. communication interface 306, 356, and/or 308), each respective additional subset of classifiers from the second non-transitory processor-readable storage medium (e.g. non-transitory processor-readable storage medium 354) to the first non-transitory processor-readable storage medium (e.g. non-transitory processor-readable storage medium 304).

After determining a characterization of context of the robot body by executing a subset of classifiers, at least one classifier of the subset of classifiers can be removed from the first non-transitory processor-readable storage medium carried by the robot body (e.g. non-transitory processor-readable storage medium 304 in FIG. 3), to preserve storage space available at the robot body. This could comprise, for example, deleting or deindexing the data corresponding to the classifier(s) to be removed. Similar to as discussed previously regarding disabling of classifiers after determining characterization of context, removing at least one classifier of a subset of classifiers can entail removing each classifier of the subset of classifiers, but this is not necessarily the case. It may be desirable to not remove, and keep active, certain classifiers in a subset, such as classifiers which provide increased flexibility as discussed above regarding disabling of classifiers. As a specific example of removing classifiers, method 400 in FIG. 4 or method 500 in FIG. 5 could further comprise removing at least one classifier of the first subset of classifiers from the first non-transitory processor-readable storage medium (e.g. non-transitory processor-readable storage medium 304) after determining the first characterization at act 404. Similarly, method 500 in FIG. 5 could further comprise removing at least one classifier of the second subset of classifiers from the first non-transitory processor-readable storage medium (e.g. non-transitory processor-readable storage medium 304) after determining the second characterization at act 510. Similarly, method 500 in FIG. 5 could further comprise removing at least one classifier of each respective additional subset of classifiers from the first non-transitory processor-readable storage medium (e.g. non-transitory processor-readable storage medium 304) after determining each respective additional characterization at act 516.

In the exemplary distributed implementation discussed above, activating a subset of classifiers, and determining a characterization of context of the robot body can be performed by the first processor (e.g. the at least one processor 302) carried by the robot body (e.g. robot body 301). That is, activation of classifiers and determination of characterization of context can be performed locally at the robot body. As a specific example, in method 400 in FIG. 4 or method 500 in FIG. 5, activating, by the robot controller, a first subset of classifiers from the library of classifiers at act 402 can comprise: activating, by the first processor (e.g. the at least one processor 302 in FIG. 3), the first subset of classifiers from the library of classifiers; and determining, by the robot controller, a first characterization of a context of the robot body at act 404 can comprise: determining, by the first processor (e.g. the at least one processor 302 in FIG. 3), a first characterization of a context of the robot body (e.g. the robot body 301 in FIG. 3). Similarly, in method 400 in FIG. 4 or method 500 in FIG. 5, activating, by the robot controller, a second subset of classifiers from the library of classifiers at act 408 can comprise: activating, by the first processor (e.g. the at least one processor 302 in FIG. 3), the second subset of classifiers from the library of classifiers; and determining, by the robot controller, a second characterization of a context of the robot body at act 510 can comprise: determining, by the first processor (e.g. the at least one processor 302 in FIG. 3), a second characterization of a context of the robot body (e.g. the robot body 301 in FIG. 3). Similarly, in method 500 in FIG. 5, activating, by the robot controller, each respective additional subset of classifiers from the library of classifiers at act 520 can comprise: activating, by the first processor (e.g. the at least one processor 302 in FIG. 3), each respective additional subset of classifiers from the library of classifiers; and determining, by the robot controller, at least one additional characterization of a context of the robot body at act 516 can comprise: determining, by the first processor (e.g. the at least one processor 302 in FIG. 3), at least one additional characterization of a context of the robot body (e.g. the robot body 301 in FIG. 3).

In the exemplary distributed implementation discussed above, selecting a subset of classifiers from the library of classifiers based on a characterization can be performed by the second processor (e.g. the at least one processor 354 in FIG. 3). That is, selection of classifiers can be performed remotely from the robot body. Prior to such selection, characterization of a context of the robot body can be performed by the first processor (e.g. the at least one processor 302 in FIG. 3), as discussed in the preceding paragraph. The determined characterization can be transferred from the first processor to the second processor via wireless communication interfaces 306 and 356, or wired communication interface 308. That is, characterization of context is determined locally at the robot body, the characterization of context is transferred remote from the robot body, and selection of a subset of classifiers is performed remote from the robot body. As a specific example, in method 400 in FIG. 4 and method 500 in FIG. 5, selecting, by the robot controller, a second subset of classifiers from the library of classifiers based on the first characterization of the context of the robot body at act 406 can comprise: selecting, by the second processor (e.g. the at least one processor 352 in FIG. 3), a second subset of classifiers from the library of classifiers based on the first characterization of the context of the robot body received from the robot body. Similarly, in method 500 in FIG. 5, selecting, by the robot controller, a third subset of classifiers from the library of classifiers based on the second characterization of the context of the robot body at act 512 can comprise: selecting, by the second processor (e.g. the at least one processor 352 in FIG. 3), a third subset of classifiers from the library of classifiers based on the second characterization of the context of the robot body received from the robot body. Similarly, in method 500 in FIG. 5, selecting, by the robot controller, a respective second additional subset of classifiers from the library of classifiers based on a respective additional characterization of the context of the robot body at act 518 can comprise: selecting, by the second processor (e.g. the at least one processor 352 in FIG. 3), the respective second additional subset of classifiers from the library of classifiers based on the respective additional characterization of the context of the robot body received from the robot body.

In the exemplary distributed implementation discussed above, outputs from executing a subset of classifiers by the first processor (e.g. the at least one processor 302 in FIG. 3) can be transferred to the second processor by a communication interface (e.g. communication interfaces 306, 308, or 356 in FIG. 3). Subsequently, a characterization of a context of the robot body can be determined by the second processor (e.g. the at least one processor 352 in FIG. 3) based on the outputs from executing the subset of classifiers. That is, execution of classifiers can be performed locally at the robot body, with the results being transferred remotely from the robot body for determination of context of the robot body remotely from the robot body. As a specific example, method 400 in FIG. 4 and method 500 in FIG. 5 can further comprise transferring, by a communication interface (e.g. communication interfaces 306, 308, or 356 in FIG. 3), outputs from executing the first subset of classifiers by the first processor (e.g. the at least one processor 302 in FIG. 3) to the second processor (e.g. the at least one processor 352 in FIG. 3); and determining, by the robot controller, a first characterization of a context of the robot body (e.g. robot body 301 in FIG. 3) at act 406 can comprise: determining, by the second processor (e.g. the at least one processor 352 in FIG. 3), a first characterization of a context of the robot body based on the outputs from executing the first subset of classifiers. Similarly, method 500 in FIG. 5 can further comprise transferring, by a communication interface (e.g. communication interfaces 306, 308, or 356 in FIG. 3), outputs from executing the second subset of classifiers by the first processor (e.g. the at least one processor 302 in FIG. 3) to the second processor (e.g. the at least one processor 352 in FIG. 3); and determining, by the robot controller, a second characterization of a context of the robot body (e.g. robot body 301 in FIG. 3) at act 510 can comprise: determining, by the second processor (e.g. the at least one processor 352 in FIG. 3), a second characterization of a context of the robot body based on the outputs from executing the second subset of classifiers. Similarly, method 500 in FIG. 5 can further comprise transferring, by a communication interface (e.g. communication interfaces 306, 308, or 356 in FIG. 3), outputs from executing each respective additional subset of classifiers by the first processor (e.g. the at least one processor 302 in FIG. 3) to the second processor (e.g. the at least one processor 352 in FIG. 3); and determining, by the robot controller, at least one additional characterization of a context of the robot body (e.g. robot body 301 in FIG. 3) at act 516 can comprise: determining, by the second processor (e.g. the at least one processor 352 in FIG. 3), at least one additional characterization of a context of the robot body based on the outputs from executing each respective additional subset of classifiers.

Several exemplary implementations are discussed above where the robot controller is distributed as components carried by the robot body and components remote from the robot body. However, in some implementations, the robot controller can be carried in its entirety by the robot body. For example, in FIG. 1, the robot controller can consist of the at least one processor 131 and the at least one non-transitory processor-readable storage medium 132 carried by robot body 101. As another example, in FIG. 2, the robot controller can consist of the at least one processor 231 and the at least one non-transitory processor-readable storage medium 232 carried by robot body 201. As yet another example, the robot controller can consist of the at least one processor 302 and the at least one non-transitory processor-readable storage medium 304 carried by robot body 301. In such examples, with reference to method 400 in FIG. 4 and method 500 in FIG. 5, the at least one processor 131, 231, or 302 can activate subsets of classifiers at acts 402, 408, 514, and 520; the at least one processor 131, 231, or 302 can determine characterizations of context of the robot body at acts 404, 510, and 516; the at least one processor 131, 231, or 302 can execute classifiers at acts 404, 510, and 516; and the at least one processor 131, 231, or 302 can select subsets of classifiers at acts 406, 512, and 518. The at least one non-transitory processor-readable storage medium 132, 232, or 304 can store the library of classifiers, from which subsets of classifiers are selected. Alternatively, the library of classifiers can be stored remotely from the robot body, and classifiers can be accessed or retrieved as needed from the library of classifiers, with the acts of methods 400 and 500 still being performed by the at least one processor 131, 231, or 302 carried by the robot body. The at least one non-transitory processor-readable storage medium 132, 232, or 304 can also store processor-executable instructions which when executed by the at least one processor 131, 231, or 302 cause the respective at least one processor 131, 231, or 302 to perform method 400 in FIG. 4 or method 500 in FIG. 5.

Further, in some implementations, the robot controller (or at least the components which perform method 400 in FIG. 4 or method 500 in FIG. 5) can be entirely remote from the robot body. With reference to FIG. 3, the robot controller can consist of the at least one processor 352 and the at least one non-transitory processor-readable storage medium 354 (or even the entirety of remote device 350). Robot body 301 is communicatively coupled to remote device 350 by wireless communication interfaces 306 and 356, and/or by wired communication interface 308. Robot body 301 can send context data (e.g., sensor data captured by a sensor carried by robot body 301) to the at least one processor 352 by wireless communication interfaces 306 and 356, and/or by wired communication interface 308. The at least one processor 352 can receive this context data, and based on the context data, method 400 in FIG. 4 or method 500 in FIG. 5 can be performed by the at least one processor 352 and the at least one non-transitory processor-readable storage medium 354. In particular, the at least one processor 352 can activate subsets of classifiers at acts 402, 408, 514, and 520; the at least one processor 352 can determine characterizations of context of the robot body at acts 404, 510, and 516; the at least one processor 352 can execute classifiers at acts 404, 510, and 516; and the at least one processor 352 can select subsets of classifiers at acts 406, 512, and 518. The at least one non-transitory processor-readable storage medium 354 can store the library of classifiers, from which subsets of classifiers are selected. Alternatively, the library of classifiers can be stored remotely from the at least one processor 352, and classifiers can be accessed or retrieved as needed from the library of classifiers, with the acts of methods 400 and 500 still being performed by the at least one processor 352. The at least one non-transitory processor-readable storage medium 354 can also store processor-executable instructions which when executed by the at least one processor 352 cause the respective at least one processor 352 to perform method 400 in FIG. 4 or method 500 in FIG. 5. The at least one processor 352 can send, via wireless communication interfaces 306 and 356 and/or wired communication interface 308, action instructions to robot body 301. For example, the at least one processor 352 can characterize context sufficiently to identify actions that should be performed by robot body 301 (e.g. to perform or assist with tasks). The at least one processor 352 can then send action instructions to the robot body 301 to perform said actions. In some implementations, such action instructions can be specific actuation instructions which control specific actuation of components of robot body 301. In other implementations, the action instructions could be more high-level; for example the action instructions may instruct robot body 301 to enter a specific mode (e.g. bathroom cleaning mode). The at least one non-transitory processor-readable storage medium 304 can store processor-executable instructions which, when executed by the at least one processor 302, cause robot body 301 to operate in said mode. For example, the at least one non-transitory processor-readable storage medium 304 can store a "bathroom cleaning" protocol, which when executed by the at least one processor 302 causes the robot body 301 to operate in a bathroom cleaning mode.

As discussed with reference to FIG. 1, robot body 101 can include at least one sensor 120, 122, 124, or 126. As discussed with reference to FIG. 2, robot body 201 can include at least one sensor 220. As discussed with reference to FIG. 3, robot body 301 can include at least one sensor 312. As mentioned above, more or fewer sensors could be included as appropriate for a given application. Any of sensors 120, 122, 124, 126, 220, or 312 can capture sensor data representing an environment of the robot body (respective to the sensor). In such a case, acts of executing a subset of classifiers from the library of classifiers comprise executing the subset of classifiers on the sensor data. As a specific example, executing, by the robot controller, the first subset of classifiers from the library of classifiers at act 404 of methods 400 and 500 comprises executing the first subset of classifiers from the library of classifiers on the sensor data. Similarly, executing, by the robot controller, the second subset of classifiers from the library of classifiers at act 510 of method 500 comprises executing the second subset of classifiers from the library of classifiers on the sensor data. Similarly, executing, by the robot controller, a respective additional subset of classifiers from the library of classifiers at act 516 of method 500 comprises executing the respective additional subset of classifiers from the library of classifiers on the sensor data.

Instead of executing classifiers directly on sensor data, it is also possible to utilize feature extraction. At least one feature extractor can be executed on sensor data, which isolates or extracts specific features of interest, and at least one classifier can be executed on the extracted features of interest. As an example, for a classifier which relies on features of an audio waveform for detection, any appropriate feature extractor can be executed, such as average frequency of certain blocks of time, a frequency histogram, maximum or minimum volume, or any other appropriate features. While it is possible to execute all available feature extractors on sensor data, then execute classifiers on the results, feature extraction can be performed in a more selective manner. In particular, what features are extracted, or what feature extractor is used, can be selected based on the needs of a classifier which is to be executed on the features extracted. For example, if a classifier needs only a frequency histogram, a frequency histogram feature extractor can be run on raw audio sensor data, whereas other frequency extractors like an average frequency extractor or a minimum/maximum volume extractor need not be activated or executed. In this way, further processing or storage resources can be saved through appropriate selection of feature extraction.

In another exemplary implementation, the robot system can comprise a user interface, such as input device 358 and or output device 360 discussed with reference to FIG. 3. Although not specifically illustrated, robot body 101 in FIG. 1, robot body 201 in FIG. 2, or robot body 301 in FIG. 3 could carry a user interface device. Method 400 in FIG. 4 or method 500 in FIG. 5 can further comprise receiving, by the user interface, input indicating at least one task to be performed by the robot body. That is, a user or operator can provide input to the robot system via a user interface, where said input is indicative of at least one task to be performed. In this way, context of the robot body may be provided, at least in part, by a user or operator. In one example, the context provided by the operator or user is in regards to an objective (e.g. a task to be performed), but in other examples an operator or user can provide other forms of context, such as an indication of location, and environmental tag or description, or any other appropriate information which can help the robot controller determine context characterization. Such operator or user input is particularly helpful during training of the robot controller. Selection of a subset of classifiers can be based at least in part on the user or operator input. As a specific example, in method 400 in FIG. 4 and method 500 in FIG. 5, selecting, by the robot controller, a second subset of classifiers from the library of classifiers based on the first characterization of the context of the robot body at act 406 can further comprise: selecting, by the robot controller, the second subset of classifiers from the library of classifiers further based on input indicating at least one task to be performed by the robot body. Similarly, in method 500 in FIG. 5, selecting, by the robot controller, a third subset of classifiers from the library of classifiers based on the second characterization of the context of the robot body at act 512 can further comprise: selecting the third subset of classifiers from the library of classifiers further based on input indicating at least one task to be performed by the robot body. Similarly, in method 500 in FIG. 5, selecting, by the robot controller, a respective second additional subset of classifiers from the library of classifiers based on a respective additional characterization of the context of the robot body at act 518 can further comprise: selecting, by the robot controller, the respective second additional subset of classifiers from the library of classifiers further based on input indicating at least one task to be performed by the robot body.

Context input by a user or operator can be preserved. That is, even as active classifiers shift (e.g. classifiers are activated, disabled or removed as a context of the robot body is refined or changes), context input by the user or operator is maintained and used to select subsets of classifiers. Additionally, context input by a user or operator can be dominant. That is, context input by the user or operator can have greater weight or precedence than context determined by executing any classifiers. As an example, an operator can input a "clean the bathrooms" input to the robot system. Based on this directive (an input of a task to be performed), the robot controller can activate and execute a subset of classifiers related to bathroom cleaning (e.g. classifiers which identify bathroom features like toilets, urinals, sinks, countertops, mirror, or any other bathroom related features). This subset of classifiers can remain active and be executed until another user/operator input is provided which instructs the robot to stop cleaning the bathrooms (or to do something else). In this way, even if the robot body is not in a bathroom environment, the robot controller will cause the robot body to continue to search for bathroom related objects and features, in order to act on the context input by the user/operator. Further, a subset of classifiers selected based on user input can be activated even before other high-level classifiers like "CEILING".

Figure 6:
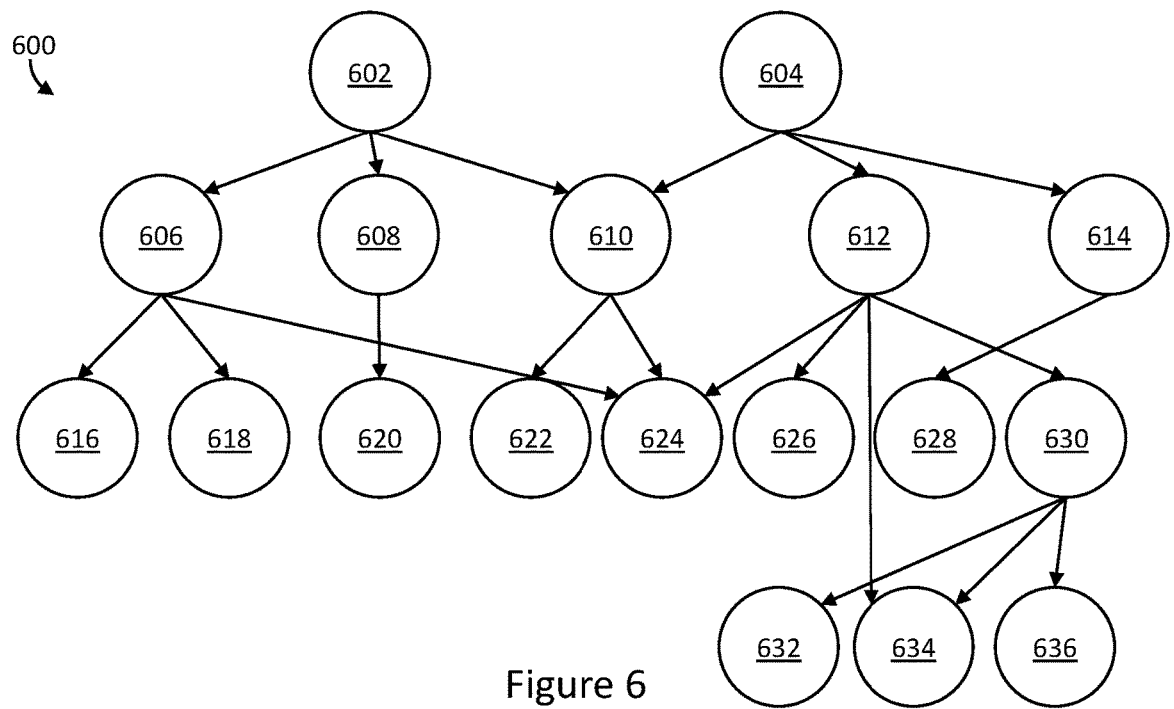
FIG. 6 illustrates an exemplary hierarchical relational model in accordance with the present systems, devices, and methods.

FIG. 6 illustrates an exemplary relational model 600 which is indicative of relationships between classifiers in a library of classifiers. Relational model 600, or any similarly structured relational model, could be employed to organize any library of classifiers. Further, relational model 600 is merely an exemplary relational model, and any other appropriate relational model could be used to organize any library of classifiers.

Relational model 600 is organized in a hierarchy having four tiers. Classifiers 602 and 604 are in a first tier, classifiers 606, 608, 610, 612, and 614 are in a second tier, classifiers 616, 618, 620, 622, 624, 626, 628, and 630 are in a third tier, and classifiers 632, 634, and 636 are in a fourth tier. The illustrated quantities of classifiers and tiers is merely exemplary, and any number of classifiers, tiers, or classifiers within a given tier can be implemented as appropriate for a given application.

With reference to the methods 400 and 500 in FIGS. 4 and 5, selection of a subset of classifiers can be based on outputs of classifiers of a previous subset of classifiers. In one example scenario, the first subset of classifiers can include classifiers 602 and 604. Positive detection by classifier 602 results in the selection of classifiers 606, 608, and 610 for the second subset of classifiers. Subsequently, positive detection by classifiers 606 and 610 results in selection of classifiers 616, 618, 622, and 624 for the third subset of classifiers. Each tier in the hierarchy of relational model 600 can become more specific, with the first tier including broad classifiers like "SKY" or "CEILING", and higher tier numbers including more specific classifiers like "TREE" or "TOILET".

Selection of a subset of classifiers based on relational model 600 is not limited to selecting a subset of classifiers from a single tier. For example, a second subset of classifiers can be selected based on the outputs of classifiers 602 and 604, but said second subset of classifiers does not have to be limited to classifiers in the second tier. For example, classifiers 602 and 604 of the first tier can be included in the second subset of classifiers, to provide greater flexibility. As another example, positive detection by classifier 612 in the second tier (and in a second subset of classifiers) can result in selection of classifier 634 in the fourth tier for a third subset of classifiers.

The illustrated relationships and linkages between classifiers in relational model 600 are merely exemplary, and any appropriate relationships and linkages could be defined. Further, the examples of selection of classifiers discussed regarding FIG. 6 are binary, i.e. positive detection by a classifier results in selection of a subset of other classifiers. However, other selection algorithms could be utilized. For example, relationships or linkages between classifiers can be weighted (e.g. by probability of detection, based on outputs of other classifiers). For example, classifier 624 could only be selected if a combined detection output of classifiers 606, 610, and 612 is sufficient. E.g., each of classifiers 606, 610, and 612 may need to output positive detection for classifier 624 to be selected, or some combination of classifiers 606, 610, and 612 may need to output positive detection for classifier 624. Each of classifiers 606, 610, and 612 may have a certain weight for positive detection, and if a combined weight of outputs of classifiers 606, 610, and 612 is high enough, classifier 624 can be selected.

Figure 7:
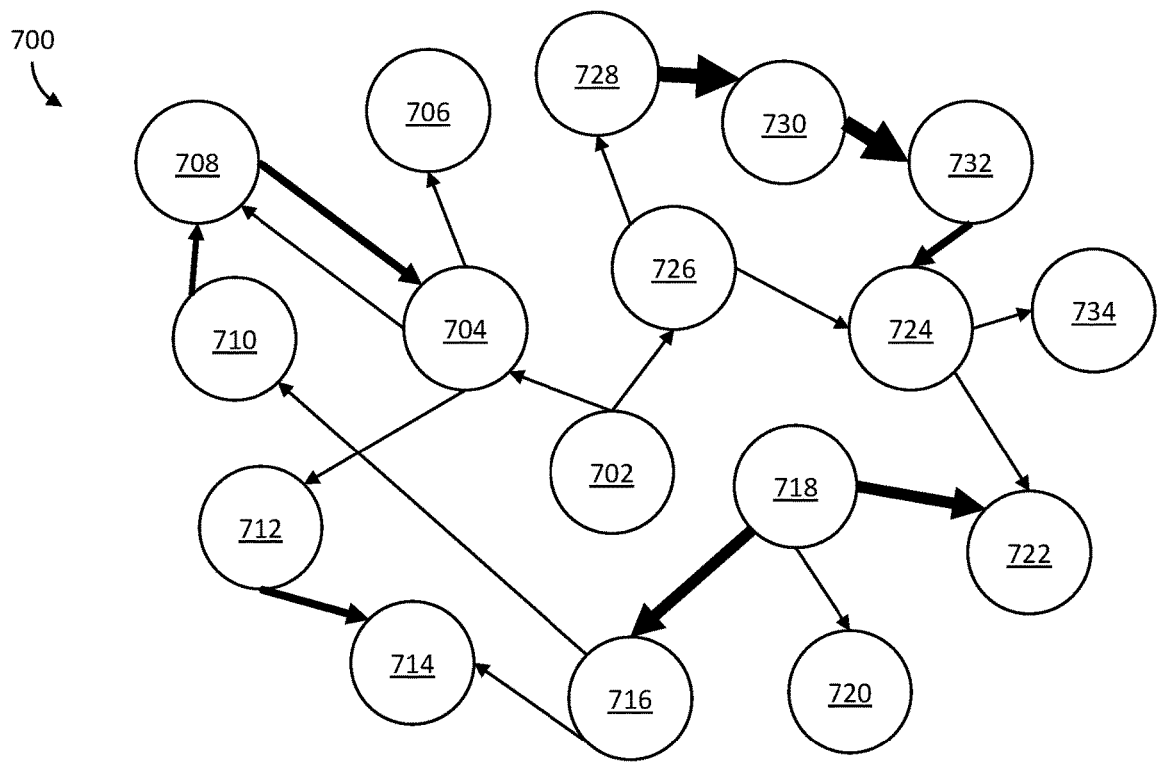
FIG. 7 illustrates an exemplary probability relational model in accordance with the present systems, devices, and methods.

FIG. 7 illustrates an exemplary relational model 700 which is indicative of relationships between classifiers in a library of classifiers. Relational model 700, or any similarly structured relational model, could be employed to organize any library of classifiers. Further, relational model 700 is merely an exemplary relational model, and any other appropriate relational model could be used to organize any library of classifiers.

Relational model 700 as illustrated includes classifiers 702, 704, 706, 708, 710, 712, 714, 716, 718, 720, 722, 724, 726, 728, 730, 732, and 734; however, any appropriate number of classifiers could be included in a relational model. With reference to the methods 400 and 500 in FIGS. 4 and 5, selection of a subset of classifiers can be based on outputs of classifiers of a previous subset of classifiers. For example, a first subset of classifiers could include classifiers 702 and 718, and a second subset of classifiers can be selected based on outputs from classifiers 702 and 718.

In relational model 700, relationships can be defined between any appropriate classifiers, such that the output of at least one classifier can be used to determine what classifiers are selected for a subset of classifiers. Such relationships can be weighted, such that a given classifier will have a respective probability of producing positive detection based on outputs from other classifiers. Such weighting is indicated in FIG. 7 by line weight for arrows connecting classifiers. That is, a thick arrow (relative to other arrows) indicates a higher probability for a classifier to output positive detection, based on output from the classifier from which the arrow extends; on the other hand, a thin arrow (relative to other arrows) indicates a higher probability for a classifier to output positive detection, based on output from the classifier from which the arrow extends. As an example, if classifier 718 outputs positive detection, there is a relatively high probability that classifiers 716 and 722 will produce positive detection, and a lower probability that classifier 720 will produce positive detection. Other classifiers to which classifier 718 is not connected have a low probability of positive detection based on the output of classifier 718. In some cases, the probability of a classifier producing positive detection can be based on the outputs of a plurality of classifiers. In the illustrated example, the probability of classifier 724 producing positive detection is based on output of classifier 726 and the output of classifier 732. As the arrow connecting classifiers 724 and 732 is heavier than the arrow connecting classifiers 726 and 724, the probability of classifier 724 producing positive detection is influenced more heavily by the output of classifier 732.

Additionally, relationships between classifiers in relational model 700 are not limited to one way relationships. As an example, classifiers 708 and 704 are illustrated as being interrelated. That is, a probability of positive detection by classifier 708 is influenced by an output of classifier 704, and conversely, a probability of positive detection by classifier 704 is influenced by an output of classifier 708.

In FIGS. 6 and 7, selection of classifiers is not limited to selection of classifiers based on positive detection by other classifiers. In some implementations, a classifier can be selected based on negative detection by another classifier.

In some implementations, the relationships between classifiers in FIGS. 6 and 7 can be implemented manually (e.g. the relationships can be determined and implemented by a human operator or designer). In other implementations, the relationships between classifiers in FIGS. 6 and 7 can be implemented automatically, such as by a machine learning algorithm. Relationships can be refined over time as additional detection data is collected.

Throughout this specification and the appended claims the term "communicative" as in "communicative coupling" and in variants such as "communicatively coupled," is generally used to refer to any engineered arrangement for transferring and/or exchanging information. For example, a communicative coupling may be achieved through a variety of different media and/or forms of communicative pathways, including without limitation: electrically conductive pathways (e.g., electrically conductive wires, electrically conductive traces), magnetic pathways (e.g., magnetic media), wireless signal transfer (e.g., radio frequency antennae), and/or optical pathways (e.g., optical fiber). Exemplary communicative couplings include, but are not limited to: electrical couplings, magnetic couplings, radio frequency couplings, and/or optical couplings.

Throughout this specification and the appended claims, infinitive verb forms are often used. Examples include, without limitation: "to encode," "to provide," "to store," and the like. Unless the specific context requires otherwise, such infinitive verb forms are used in an open, inclusive sense, that is as "to, at least, encode," "to, at least, provide," "to, at least, store," and so on.

This specification, including the drawings and the abstract, is not intended to be an exhaustive or limiting description of all implementations and embodiments of the present systems, devices, and methods. A person of skill in the art will appreciate that the various descriptions and drawings provided may be modified without departing from the spirit and scope of the disclosure. In particular, the teachings herein are not intended to be limited by or to the illustrative examples of computer systems and computing environments provided.

This specification provides various implementations and embodiments in the form of block diagrams, schematics, flowcharts, and examples. A person skilled in the art will understand that any function and/or operation within such block diagrams, schematics, flowcharts, or examples can be implemented, individually and/or collectively, by a wide range of hardware, software, and/or firmware. For example, the various embodiments disclosed herein, in whole or in part, can be equivalently implemented in one or more: application-specific integrated circuit(s) (i.e., ASICs); standard integrated circuit(s); computer program(s) executed by any number of computers (e.g., program(s) running on any number of computer systems); program(s) executed by any number of controllers (e.g., microcontrollers); and/or program(s) executed by any number of processors (e.g., microprocessors, central processing units, graphical processing units), as well as in firmware, and in any combination of the foregoing.

The various implementations described herein may include, or be combined with, any or all of the systems, devices, and methods described in U.S. patent application Ser. No. 16/940,566 (Publication No. US 2021-0031383 A1), U.S. patent application Ser. No. 17/023,929 (Publication No. US 2021-0090201 A1), U.S. patent application Ser. No. 17/061,187 (Publication No. US 2021-0122035 A1), U.S. patent application Ser. No. 17/098,716 (Publication No. US 2021-0146553 A1), U.S. patent application Ser. No. 17/111,789 (Publication No. US 2021-0170607 A1), U.S. patent application Ser. No. 17/158,244 (Publication No. US 2021-0234997 A1), U.S. patent application Ser. No. 17/749,536, U.S. Provisional Patent Application Ser. No. 63/001,755 (Publication No. US 2021-0307170 A1), and/or U.S. Provisional Patent Application Ser. No. 63/057,461, as well as U.S. Provisional Patent Application Ser. No. 63/151,044, U.S. Provisional Patent Application Ser. No. 63/173,670, U.S. Provisional Patent Application Ser. No. 63/184,268, U.S. Provisional Patent Application Ser. No. 63/213,385, U.S. Provisional Patent Application Ser. No. 63/232,694, U.S. Provisional Patent Application Ser. No. 63/253,591, U.S. Provisional Patent Application Ser. No. 63/293,968, U.S. Provisional Patent Application Ser. No. 63/293,973, U.S. Provisional Patent Application Ser. No. 63/278,817, and/or U.S. patent application Ser. No. 17/566,589, each of which is incorporated herein by reference in its entirety.

Throughout this specification and the appended claims, a "memory" or "storage medium" is a processor-readable medium that is an electronic, magnetic, optical, electromagnetic, infrared, semiconductor, or other physical device or means that contains or stores processor data, data objects, logic, instructions, and/or programs. When data, data objects, logic, instructions, and/or programs are implemented as software and stored in a memory or storage medium, such can be stored in any suitable processor-readable medium for use by any suitable processor-related instruction execution system, apparatus, or device, such as a computer-based system, processor-containing system, or other system that can fetch the data, data objects, logic, instructions, and/or programs from the memory or storage medium and perform various acts or manipulations (i.e., processing steps) thereon and/or in response thereto. Thus, a "non-transitory processor-readable storage medium" can be any element that stores the data, data objects, logic, instructions, and/or programs for use by or in connection with the instruction execution system, apparatus, and/or device. As specific non-limiting examples, the processor-readable medium can be: a portable computer diskette (magnetic, compact flash card, secure digital, or the like), a random access memory (RAM), a read-only memory (ROM), an erasable programmable read-only memory (EPROM, EEPROM, or Flash memory), a portable compact disc read-only memory (CDROM), digital tape, and/or any other non-transitory medium.

The claims of the disclosure are below. This disclosure is intended to support, enable, and illustrate the claims but is not intended to limit the scope of the claims to any specific implementations or embodiments. In general, the claims should be construed to include all possible implementations and embodiments along with the full scope of equivalents to which such claims are entitled.

The invention claimed is:

1. A method of operating a robot, the method comprising:
receiving sensor data representing an environment of the robot, wherein the environment comprises a set of features;
executing a first subset of classifiers selected from a library of classifiers comprising a set of classifiers on the sensor data, wherein executing the first subset of classifiers identifies a first subset of features in the environment of the robot;
determining a first characterization of a context of the robot based on a result of executing the first subset of classifiers;
selecting a second subset of classifiers from the library of classifiers, wherein the second subset of classifiers is different from the first subset of classifiers;
executing the second subset of classifiers on the sensor data, wherein executing the second subset of classifiers identifies a second subset of features in the environment of the robot;
determining a second characterization of the context of the robot based on a result of executing the second subset of classifiers;
determining the context of the robot based at least in part on the first characterization of the context of the robot and the second characterization of the context of the robot;
identifying a task for the robot to perform based at least in part on the context of the robot;
selecting a third subset of classifiers from the library of classifiers, wherein the third subset of classifiers is different from the first subset of classifiers and the second subset of classifiers;
executing the third subset of classifiers on the sensor data, wherein executing the third subset of classifiers identifies a third subset of features in the environment of the robot;
determining a third characterization of the context of the robot based on a result of executing the third subset of classifiers; and
adjusting the context of the robot based on the third characterization of the robot.

2. The method of claim 1, wherein receiving sensor data representing the environment of the robot comprises receiving the sensor data from one or more sensors coupled to a body of the robot.

3. The method of claim 1, wherein executing the first subset of classifiers comprises activating the first subset of classifiers.

4. The method of claim 3, further comprising disabling at least one of the classifiers of the first subset of classifiers based on the first characterization of the context of the robot.

5. The method of claim 1, wherein selecting the second subset of classifiers from the library of classifiers comprises selecting the second subset of classifiers based on the first characterization of the context of the robot.

6. The method of claim 5, wherein the library of classifiers is arranged in a hierarchy, and wherein selecting the second subset of classifiers from the library of classifiers comprises traversing the hierarchy to select the second subset of classifiers.

7. The method of claim 5, wherein the library classifiers is arranged based on a relational model, and wherein selecting the second subset of classifiers from the library of classifiers comprises selecting the second subset of classifiers connected to the first subset of classifiers by linkages in the relational model.

8. The method of claim 5, wherein selecting the second subset of classifiers from the library of classifiers comprises selecting the second subset of classifiers based on probabilistic relationships between the first subset of classifiers and other classifiers in the library of classifiers.

9. The method of claim 8, further comprising adjusting the probabilistic relationships based on the result of executing the second subset of classifiers on the sensor data.

10. The method of claim 1, wherein selecting the second subset of classifiers from the library of classifiers comprises selecting each classifier of the second subset of classifiers based on an output of at least one classifier of the first subset of classifiers on the sensor data.

11. The method of claim 1, wherein executing the second subset of classifiers comprises activating the second subset of classifiers.

12. The method of claim 11, further comprising disabling at least one of the classifiers of the second subset of classifiers based on the second characterization of the context of the robot.

13. The method of claim 1, wherein adjusting the context of the robot based on the third characterization of the robot is performed prior to identifying a task for the robot based at least in part on the context of the robot.

14. The method of claim 1, further comprising identifying a new task for the robot based at least in part on the context of the robot.

15. One or more non-transitory computer-readable storage media storing computer-executable instructions for causing a robot controller to perform operations comprising:
receiving sensor data representing an environment of the robot, wherein the environment comprises a set of features;
executing a first subset of classifiers selected from a library of classifiers comprising a set of classifiers on the sensor data, wherein executing the first subset of classifiers identifies a first subset of features in the environment of the robot;
determining a first characterization of a context of the robot based on a result of executing the first subset of classifiers;
selecting a second subset of classifiers from the library of classifiers, wherein the second subset of classifiers is different from the first subset of classifiers;
executing the second subset of classifiers on the sensor data, wherein executing the second subset of classifiers identifies a second subset of features in the environment of the robot;
determining a second characterization of the context of the robot based on a result of executing the second subset of classifiers;
determining the context of the robot based at least in part on the first characterization of the context of the robot and the second characterization of the context of the robot;
identifying a task for the robot to perform based at least in part on the context of the robot;
selecting a third subset of classifiers from the library of classifiers, wherein the third subset of classifiers is different from the first subset of classifiers and the second subset of classifiers;
executing the third subset of classifiers on the sensor data, wherein executing the third subset of classifiers identifies a third subset of features in the environment of the robot;
determining a third characterization of the context of the robot based on a result of executing the third subset of classifiers; and adjusting the context of the robot based on the third characterization of the robot.

16. The one or more non-transitory computer-readable storage media of claim 15, wherein selecting the second subset of classifiers from the library of classifiers comprises selecting the second subset of classifiers based on the first characterization of the context of the robot.

17. The one or more non-transitory computer-readable storage media of claim 15, wherein the operations further comprise:
disabling at least one of the classifiers in the first subset of classifiers or the second subset of classifiers based on the first characterization of the context of the robot or the second characterization of the context of the robot.

18. A robot system comprising:
a robot body;
one or more sensors coupled to the robot body and arranged to collect sensor data from an environment of the robot body, wherein the environment comprises a set of features; and
a robot controller comprising one or more processors and one or more non-transitory computer-readable storage media communicatively coupled to the one or more processors, the one or more non-transitory computer-readable storage media storing computer-executable instructions for causing the robot controller to perform operations comprising:
receiving sensor data from the one or more sensors;
executing a first subset of classifiers selected from a library of classifiers comprising a set of classifiers on the sensor data, wherein executing the first subset of classifiers identifies a first subset of features in the environment of the robot;
determining a first characterization of a context of the robot based on a result of executing the first subset of classifiers;
selecting a second subset of classifiers from the library of classifiers, wherein the second subset of classifiers is different from the first subset of classifiers;
executing the second subset of classifiers on the sensor data, wherein executing the second subset of classifiers identifies a second subset of features in the environment of the robot;
determining a second characterization of the context of the robot based on a result of executing the second subset of classifiers;
determining the context of the robot based at least in part on the first characterization of the context of the robot and the second characterization of the context of the robot;
identifying a task for the robot to perform based at least in part on the context of the robot;
selecting a third subset of classifiers from the library of classifiers, wherein the third subset of classifiers is different from the first subset of classifiers and the second subset of classifiers;
executing the third subset of classifiers on the sensor data, wherein executing the third subset of classifiers identifies a third subset of features in the environment of the robot;
determining a third characterization of the context of the robot based on a result of executing the third subset of classifiers; and
adjusting the context of the robot based on the third characterization of the robot.

19. The robot system of claim 18, wherein at least one component of the robot controller is coupled to the robot body.

* * * * *